US011494203B2

(12) United States Patent
Cohen et al.

(10) Patent No.: US 11,494,203 B2
(45) Date of Patent: Nov. 8, 2022

(54) APPLICATION INTEGRATION FOR ROBOTIC PROCESS AUTOMATION

(71) Applicant: UiPath, Inc., New York, NY (US)

(72) Inventors: Evan Cohen, Seatle, WA (US); Justin Marks, Redmond, WA (US); Palak Kadakia, Bellevue, WA (US); Ankit Saraf, Bellevue, WA (US); Bridgette Graham, Wilderness (ZA)

(73) Assignee: UiPath, Inc., New York, NY (US)

( * ) Notice: Subject to any disclaimer, the term of this patent is extended or adjusted under 35 U.S.C. 154(b) by 8 days.

(21) Appl. No.: 15/930,518

(22) Filed: May 13, 2020

(65) Prior Publication Data
US 2021/0357236 A1 Nov. 18, 2021

(51) Int. Cl.
| G06F 9/451 | (2018.01) |
| G06F 8/34 | (2018.01) |
| G06F 8/38 | (2018.01) |
| G06F 9/54 | (2006.01) |
| G06F 8/60 | (2018.01) |

(52) U.S. Cl.
CPC ............... G06F 9/451 (2018.02); G06F 8/34 (2013.01); G06F 8/38 (2013.01); G06F 8/60 (2013.01); G06F 9/547 (2013.01)

(58) Field of Classification Search
CPC ... G06F 9/451; G06F 8/38; G06F 8/34; G06F 9/547; G06F 8/60; G06F 9/542; B25J 9/163; G05B 2219/50391
See application file for complete search history.

(56) References Cited

U.S. PATENT DOCUMENTS

| 8,141,128 | B2 | 3/2012 | Wyk et al. |
| 9,555,544 | B2 | 1/2017 | Bataller et al. |
| 9,678,723 | B2 | 6/2017 | Itani et al. |
| 10,592,082 | B2 | 3/2020 | Twist et al. |
| 10,654,166 | B1* | 5/2020 | Hall ...................... G06F 9/4843 |
| 10,911,546 | B1* | 2/2021 | Goswami ................ G06F 9/452 |
| 2010/0023141 | A1* | 1/2010 | Wang ...................... G06F 8/38 |
| | | | 700/86 |

(Continued)

OTHER PUBLICATIONS

International Search Report and Written Opinion of the International Search Authority issued for PCT Application No. PCT/US2020/052160 dated Feb. 9, 2021.

(Continued)

Primary Examiner — Phenuel S Salomon
(74) Attorney, Agent, or Firm — LeonardPatel PC; Michael A. Leonard, II; Sheetal S. Patel

(57) ABSTRACT

Application integration for robotic process automation (RPA) using a development application configured for development of RPA-enabled applications is disclosed. The development application in some embodiments may be used for application integration with attended robots that execute locally on the same computing system as an instance of the RPA-enabled application, unattended robots that execute on a remote computing system, or both, creating an RPA-enabled application. One or more user interface (UI) elements, variables, and/or events of an RPA-enabled application may be linked to one or more respective RPA processes, causing respective RPA robot(s) to carry out the associated functionality.

20 Claims, 17 Drawing Sheets

(56) References Cited

U.S. PATENT DOCUMENTS

| | | | |
|---|---|---|---|
| 2010/0064357 A1* | 3/2010 | Baird | G06F 8/30 |
| | | | 726/6 |
| 2012/0117456 A1* | 5/2012 | Koskimies | G06F 9/44505 |
| | | | 715/224 |
| 2016/0285708 A1* | 9/2016 | Papadopoulos | H04L 67/10 |
| 2017/0001308 A1* | 1/2017 | Bataller | G05B 19/0423 |
| 2017/0272316 A1* | 9/2017 | Johnson | G06Q 10/103 |
| 2017/0288943 A1 | 10/2017 | Plumb et al. | |
| 2017/0352041 A1 | 12/2017 | Ramamurthy et al. | |
| 2018/0189170 A1* | 7/2018 | Dwarakanath | G06T 7/70 |
| 2018/0197123 A1* | 7/2018 | Parimelazhagan | |
| | | | G06Q 10/0633 |
| 2018/0210747 A1* | 7/2018 | Smith | G06F 15/16 |
| 2018/0321833 A1 | 11/2018 | Nelson et al. | |
| 2018/0345489 A1* | 12/2018 | Allen, IV | G05B 19/0421 |
| 2019/0015974 A1 | 1/2019 | Mummigatti et al. | |
| 2019/0130094 A1* | 5/2019 | Votaw | G06F 21/44 |
| 2019/0138596 A1* | 5/2019 | Singh | G06F 9/453 |
| 2019/0147382 A1* | 5/2019 | Krishnamurthy | H04L 63/102 |
| | | | 705/7.26 |
| 2019/0155225 A1* | 5/2019 | Kothandaraman | G06N 3/006 |
| 2020/0073686 A1* | 3/2020 | Hanke | G06F 9/45512 |
| 2020/0134374 A1* | 4/2020 | Oros | G06N 3/08 |
| 2020/0213422 A1* | 7/2020 | Pandya | H04L 67/38 |
| 2020/0233707 A1* | 7/2020 | Ramamurthy | G06F 8/70 |
| 2020/0346353 A1* | 11/2020 | Szabo | G05B 19/4155 |
| 2020/0401430 A1* | 12/2020 | Berg | G06V 30/153 |
| 2021/0129325 A1* | 5/2021 | Yu | B25J 9/1661 |

OTHER PUBLICATIONS

Interacting with Power Automate Flows from Power Apps article available at https://www.inogic.com/blog/2019/12/interacting-with-power-automate-flows/ (last accessed May 15, 2020).

Jacada Example RPA Trigger page available at https://jacada.zendesk.eom/hc/en-us/articles/360030877591-An-Example-RPA-Trigger (last accessed May 15, 2020).

Kapow Kapplets Users Guide pages available at http://help.kapowsoftware.com/9.4/index.jsp?topic=/doc/tut2/ManagementConsole.html via side menu (last accessed May 15, 2020).

Kapow Katalyst Design Studio pages available at http://help.kapowsoftware.com/9.4/index.jsp?topic=/doc/tut2/ManagementConsole.html via side menu (last accessed May 15, 2020).

Kapow Katalyst Getting Started pages available at http://help.kapowsoftware.com/9.4/index.jsp?topic=/doc/tut2/ManagementConsole.html via side menu (last accessed May 15, 2020).

Kapow Katalyst Programming with Robots pages available at http://help.kapowsoftware.com/9.4/index.jsp?topic=/doc/tut2/ManagementConsole.html via side menu (last accessed May 15, 2020).

European Search Report issued in EP Application No. 20199177 dated Feb. 19, 2021.

* cited by examiner

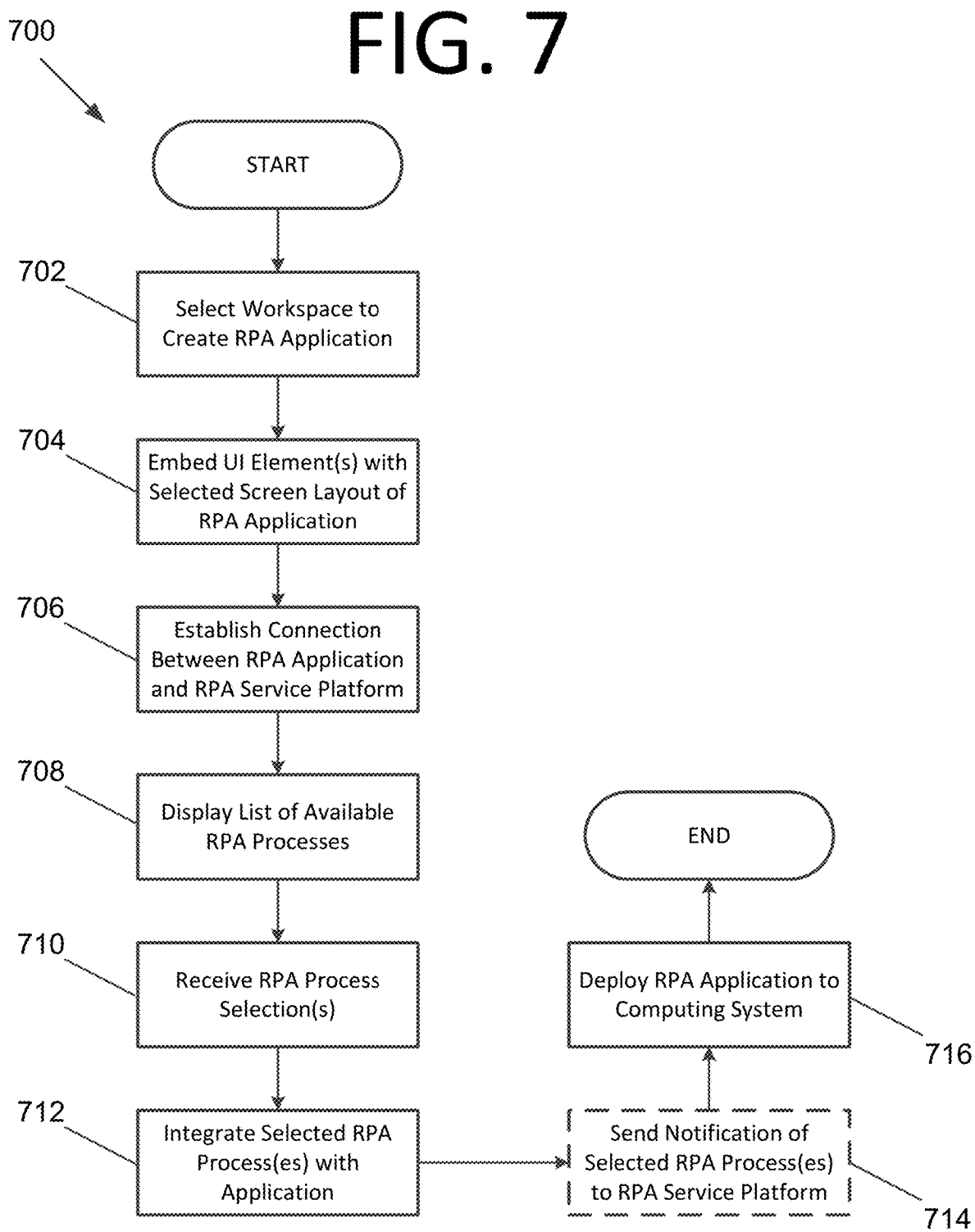

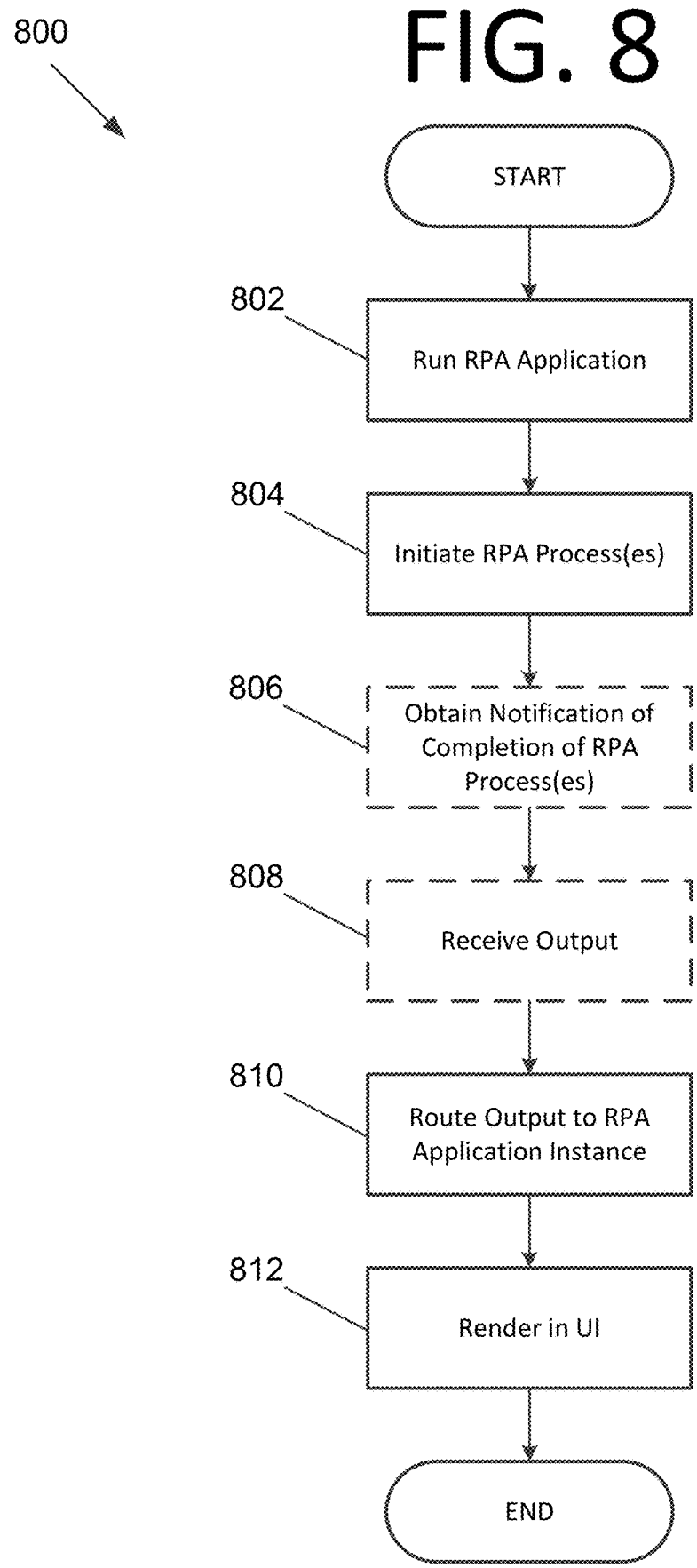

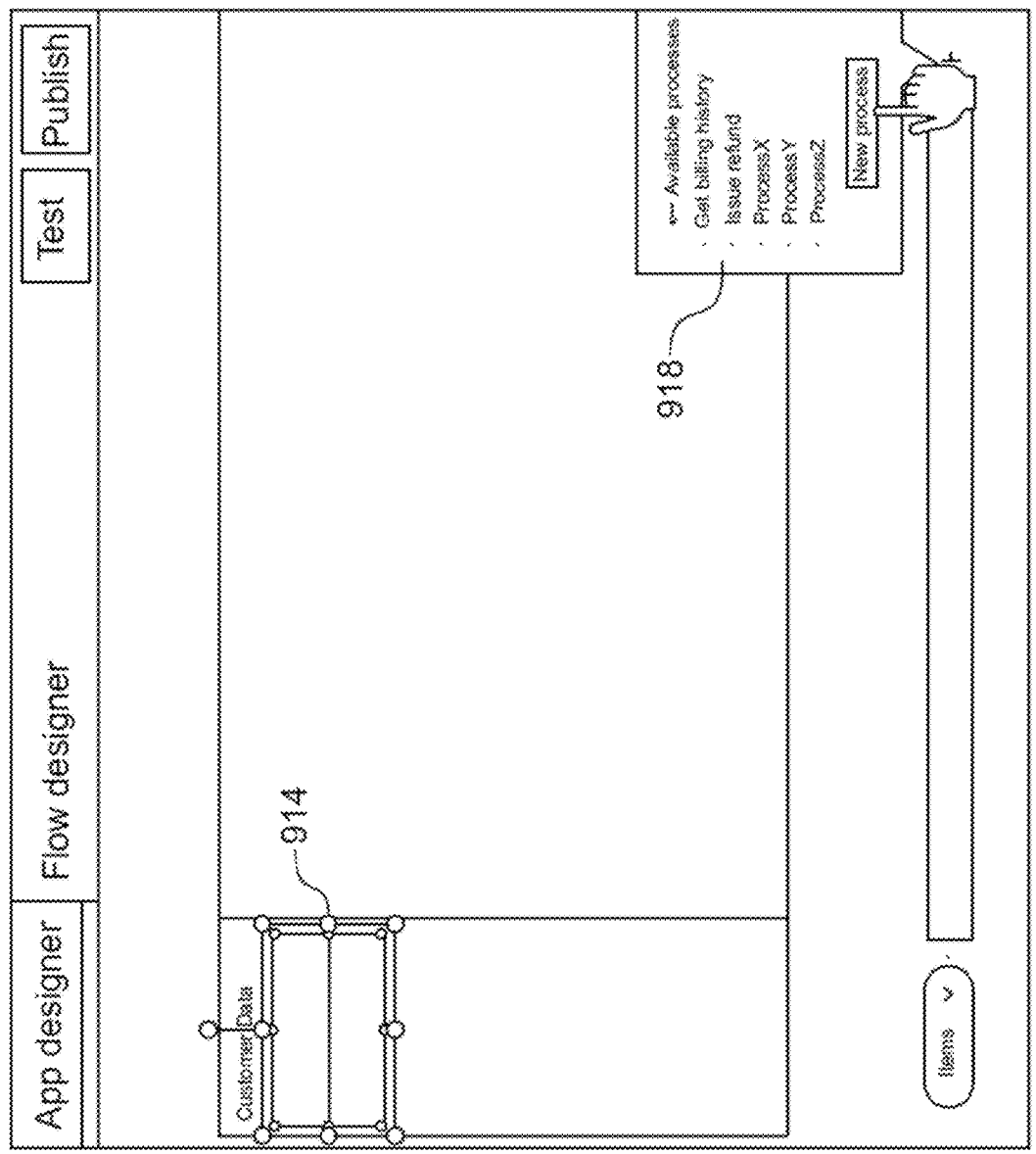

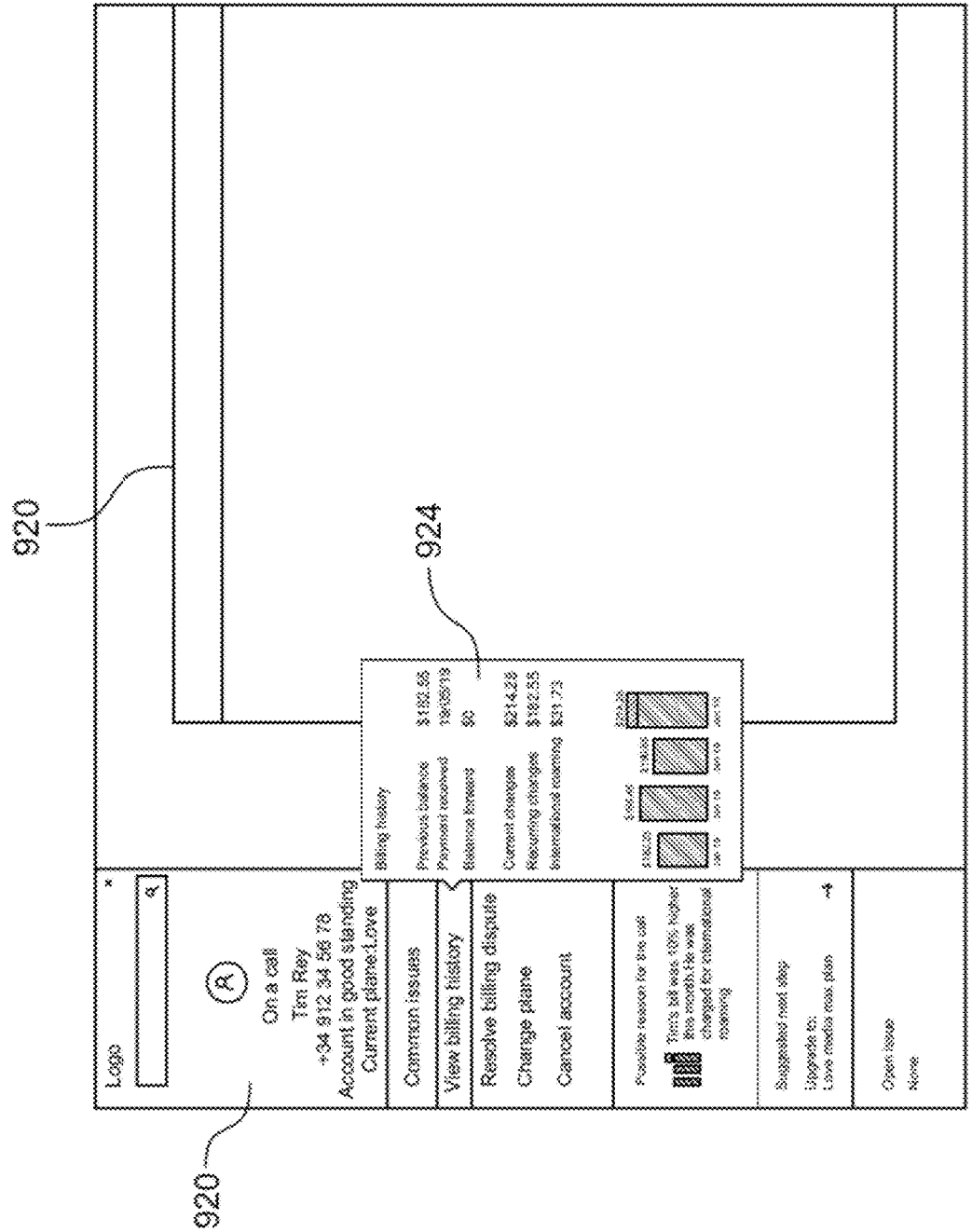

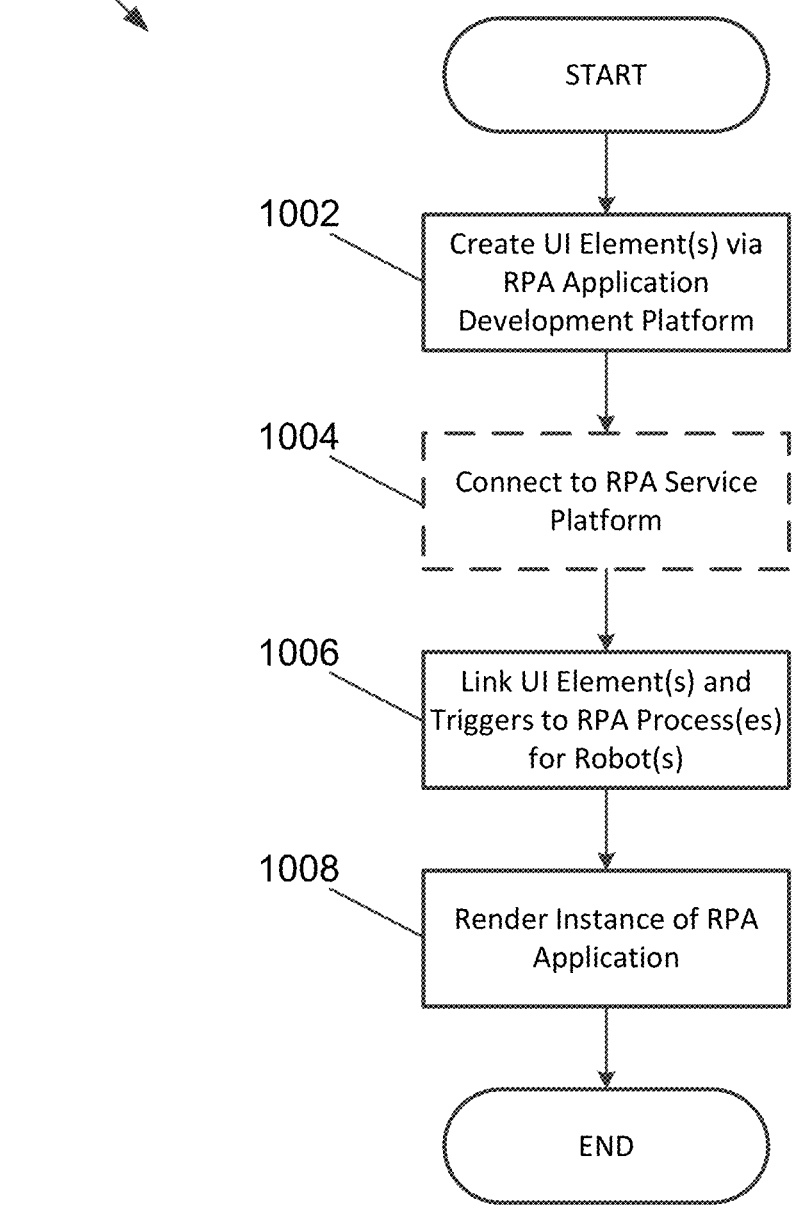

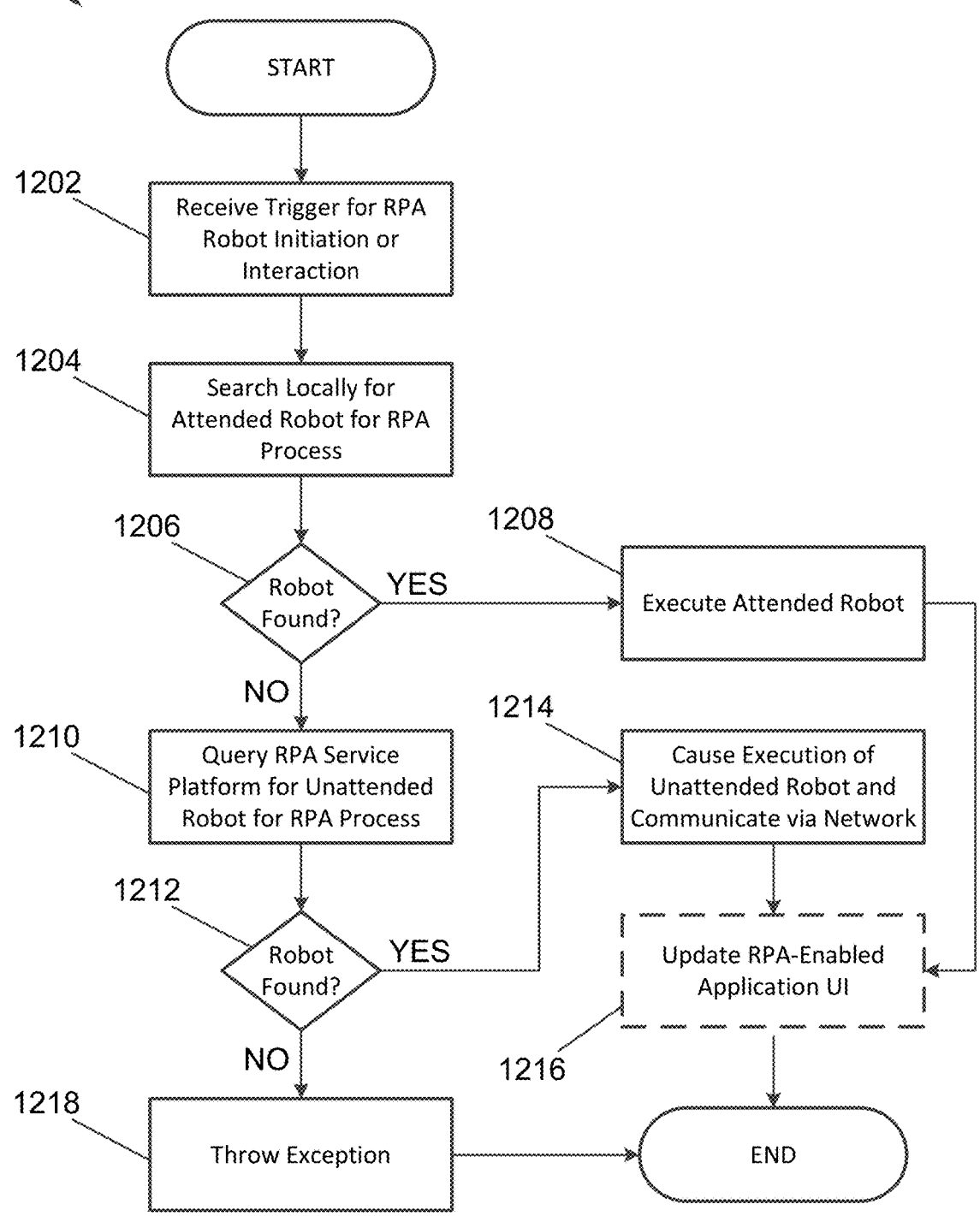

APPLICATION INTEGRATION FOR ROBOTIC PROCESS AUTOMATION

FIELD

The present invention generally relates to robotic process automation (RPA), and more particularly, to application integration for RPA.

BACKGROUND

Robotic process automation (RPA) may automate repetitive tasks, such as those that routinely occur and require manual efforts from users of computing systems. For example, RPA robots may log into applications, enter data, perform calculations, complete tasks, and then log out. A user may run more than one RPA robot to complete a collective task or may run multiple RPA robots to complete multiple tasks. It may be beneficial to automate various interactions with applications with RPA robots to carry out repetitive tasks without involving a human. Current RPA technologies provide hard-coded automation functionality in the applications. Accordingly, an improved solution for RPA may be beneficial.

SUMMARY

Certain embodiments of the present invention may provide solutions to the problems and needs in the field of art that have not yet been fully identified, appreciated, or solved by current RPA technologies. For example, some embodiments pertain to application integration for RPA, potentially facilitated by a low-code development application.

In an embodiment, a computer-implemented method for developing an RPA-enabled application includes linking a trigger in the RPA-enabled application to an RPA process to be executed by an RPA robot, by a development application. The computer-implemented method also includes generating an instance of the RPA-enabled application including the linked trigger, by the development application, and deploying the instance of the RPA-enabled application to a computing system, by the development application.

In another embodiment, a computer program for developing an RPA-enabled application is embodied on a non-transitory computer-readable medium. The program is configured to cause at least one processor to link a trigger in the RPA-enabled application to an RPA process to be executed by an RPA robot. The program is also configured to cause the at least one processor to generate an instance of the RPA-enabled application including the linked trigger and deploy the instance of the RPA-enabled application to a computing system.

In yet another embodiment, a computer program is embodied on a non-transitory computer-readable medium. The program is configured to cause at least one processor to receive a trigger for initiation of an RPA process to be executed by an RPA robot. The program is also configured to cause the at least one processor to send a process initiation request to an RPA service platform for an unattended robot or to a locally executing attended robot via Inter-Process Communication (IPC). The program is further configured to cause the at least one processor to receive output generated from running the RPA process from the attended robot via IPC or from the RPA service platform for the unattended RPA robot.

BRIEF DESCRIPTION OF THE DRAWINGS

In order to readily understand the advantages of certain embodiments of the invention, a more particular description of the briefly described above invention will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 7 is a flowchart illustrating a process for developing an RPA application using an application development platform, according to an embodiment of the present invention.

FIG. 8 is a flowchart illustrating a process for execution of the RPA application, according to an embodiment of the present invention.

FIGS. 9A-9E collectively illustrate a plurality of user interfaces (UIs) showing design time environment and operating time environment for creating the RPA application, according to an embodiment of the present invention.

FIG. 10 is a flowchart illustrating a process for developing an RPA-enabled application, according to an embodiment of the present invention.

FIG. 12 is a flowchart illustrating a process for searching for attended or unattended RPA robots to perform an RPA process and executing the RPA process, according to an embodiment of the present invention.

Unless otherwise indicated, similar reference characters denote corresponding features consistently throughout the attached drawings.

DETAILED DESCRIPTION OF THE EMBODIMENTS

Figure 1:
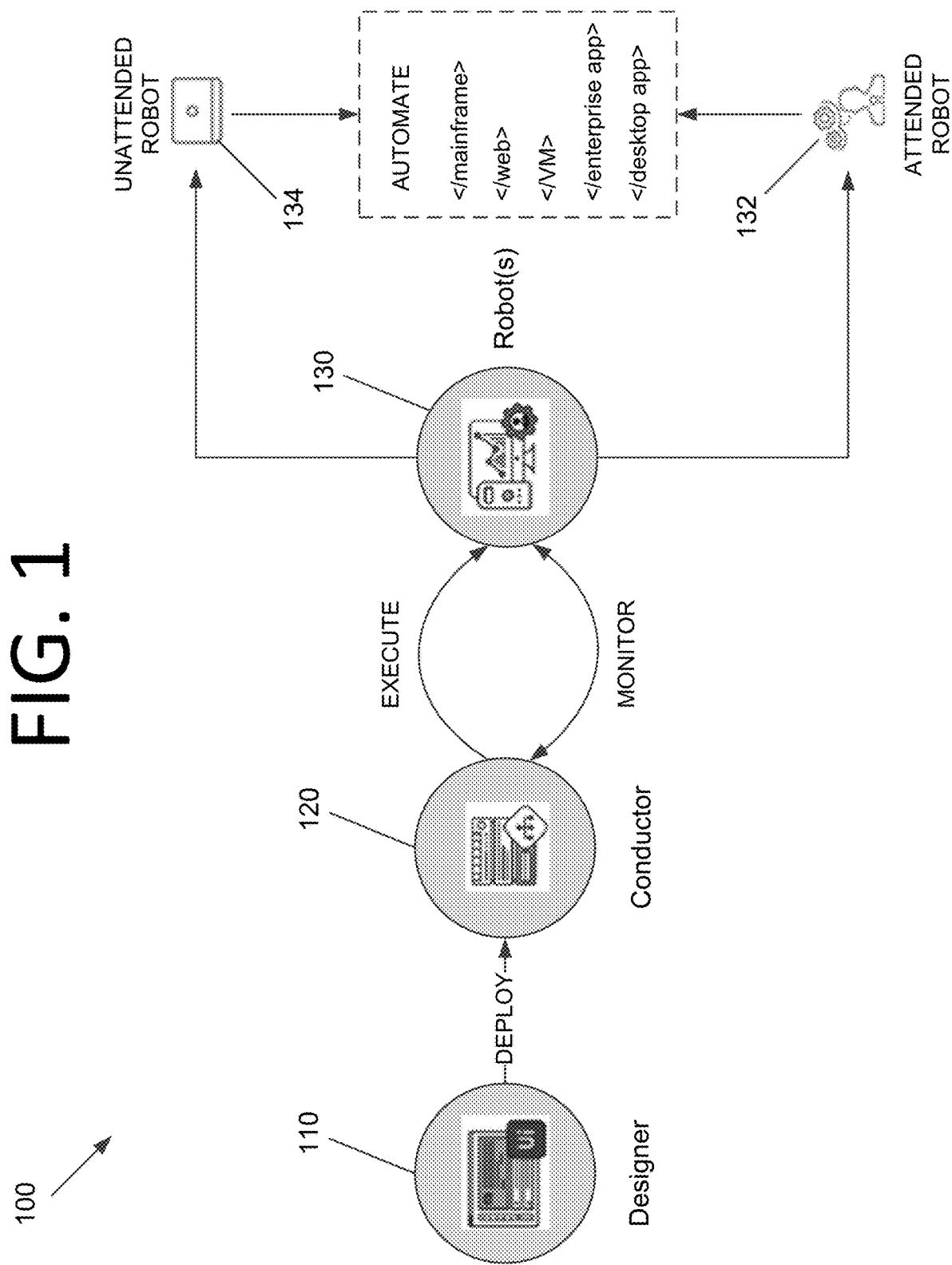
FIG. 1 is an architectural diagram illustrating an RPA system, according to an embodiment of the present invention.

Some embodiments pertain to application integration for RPA using a development application configured for development of RPA-enabled applications. In some embodiments, the development application is a low-code development application. In certain embodiments, the development application can be used for application integration with attended robots that execute locally on the same computing system as an instance of the RPA-enabled application, unattended robots that execute on a remote computing system, or both, creating an RPA-enabled application. In some embodiments, the instance of the RPA-enabled application first attempts to find a local RPA robot to execute a process, and if not found, attempts to find a remote RPA robot to execute the process. In certain embodiments, the developer application is web-based. One or more user interface (UI) elements of an RPA-enabled application may be linked to one or more respective RPA processes, causing respective RPA robot(s) to carry out the associated functionality.

As used herein, "low-code" means that development tasks may be completed largely or completely without manual programming on the part of the user. Also, an application being "integrated with RPA," being "RPA-enabled," or being an "RPA application" as used herein means that the application or an instance thereof may initialize, call, or otherwise interact with one or more RPA robots during its execution via one or more UI elements or triggers. In some embodiments, a low-code development application for developing software applications that interact with RPA robots may be largely or completely drag-and-drop such that individuals without substantial programming knowledge can develop RPA robots. This may enable business analysts, for example, to create RPA robots implementing various business logic. Indeed, any employee may be able to create his or her own RPA robots in some embodiments. Thus, an application (e.g., an RPA robot or another software application) may be developed using a low-code development application and then executed on a computing system to interact with RPA robots in some embodiments.

In some embodiments, the development application may have discovery functionality for RPA robots. The development application may first check whether local attended robots exist to perform a task. If no robot(s) are locally available for the task, the development application may then check for remote unattended robots to complete the task.

In some embodiments, an application developed using the development application communicates with local attended robots that it may interact with via an Inter-Process Communication (IPC) protocol. IPC protocols may facilitate communication via the network, pipes, Component Object Model (COM), Remote Procedure Calls (RPC), sockets, etc. IPC protocols may be used for Windows® or any other suitable operating system, where supported. The application calling or otherwise interacting with the robot may send a communication (e.g., a command) to the robot process using the IPC protocol. The robot may send status notifications back to the application (e.g., indicating that the robot is starting, running, paused, etc.) via the IPC protocol as well.

In some embodiments, certain activities that may be in a workflow of a robot integrated with the application that provide certain functionality without creating an entirely new process. For instance, activities may be provided that provide error handling, gather additional information, etc., without the user developing a new robot for that task. Using bidirectional communication at runtime (e.g., via IPC), data may be sent to and received from the robot while its process is executing. The robot could thus provide intermediate results as its process executes. For example, if a robot gathers data from ten legacy systems, the robot may provide the data gathering results to the application after data gathering for each legacy system is completed. In certain embodiments, inline workflows may be used to perform some RPA activities on the web.

In some embodiments, the user may define whether a robot runs attended or unattended. This may be accomplished by setting a rule for starting the RPA robot process. While robots may start due to a user action, such as a button click, a page load, etc., robots could start due to any logical reason (e.g., due to occurrence of an event, due to a value change, due to the receipt of certain information, etc.). In certain embodiments, the user may specify for the application to use an "intelligent" option where the application first looks for a suitable local attended robot, and if not found, then looks for a remote unattended robot (e.g., via an RPA service platform) to complete a task.

In some embodiments, there is no build server for the development application. Instead, an application definition may be created in the background as the user implements the associated logic using the development application. The application definition for the RPA-enabled application may then be downloaded to a computing system that will execute the application at runtime, and the application definition, how the RPA-enabled application is rendered, etc. may be controlled in a declarative manner at runtime. In some embodiments, JavaScript classes may be used for this script. A reference to the robot process may be stored in the RPA-enabled application, but not the RPA process itself in some embodiments.

Embodiments may be employed for robotic process automation (RPA). FIG. 1 is an architectural diagram illustrating an RPA system 100, according to an embodiment of the present invention. RPA system 100 includes a designer 110 that allows a developer to design and implement workflows. Designer 110 may provide a solution for application integration, as well as automating third-party applications, administrative Information Technology (IT) tasks, and business IT processes. Designer 110 may facilitate development of an automation project, which is a graphical representation of a business process. Simply put, designer 110 facilitates the development and deployment of workflows and robots.

The automation project enables automation of rule-based processes by giving the developer control of the execution order and the relationship between a custom set of steps developed in a workflow, defined herein as "activities." One commercial example of an embodiment of designer 110 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, FSMs, and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 110, execution of business processes is orchestrated by conductor 120, which orchestrates one or more robots 130 that execute the workflows developed in designer 110. One commercial example of an embodiment of conductor 120 is UiPath Orchestrator™. Conductor 120 facilitates management of the creation, monitoring, and deployment of resources in an environment. Conductor 120 may act as an integration point, or one of the aggregation points, with third-party solutions and applications.

Conductor 120 may manage a fleet of robots 130, connecting and executing robots 130 from a centralized point. Types of robots 130 that may be managed include, but are not limited to, attended robots 132, unattended robots 134, development robots (similar to unattended robots 134, but used for development and testing purposes), and nonproduction robots (similar to attended robots 132, but used for development and testing purposes). Attended robots 132 may be triggered by user events or be scheduled to automatically happen, and operate alongside a human on the same computing system. Attended robots 132 may be used with conductor 120 for a centralized process deployment and logging medium. Attended robots 132 may help the human user accomplish various tasks, and may be triggered by user events. In some embodiments, processes cannot be started from conductor 120 on this type of robot and/or they cannot run under a locked screen. In certain embodiments, attended robots 132 can only be started from a robot tray or from a command prompt. Attended robots 132 should run under human supervision in some embodiments.

Unattended robots 134 run unattended in virtual environments or on physical machines, and can automate many processes. Unattended robots 134 may be responsible for remote execution, monitoring, scheduling, and providing support for work queues. Debugging for all robot types may be run from designer 110 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 120 may have various capabilities including, but not limited to, provisioning, deployment, versioning, configuration, queueing, monitoring, logging, and/or providing interconnectivity. Provisioning may include creating and maintenance of connections between robots 130 and conductor 120 (e.g., a web application). Deployment may include assuring the correct delivery of package versions to assigned robots 130 for execution. Versioning may include management of unique instances of some process or configuration in some embodiments. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 120 may provide interconnectivity by acting as the centralized point of communication for third-party solutions and/or applications.

Robots 130 are execution agents that run workflows built in designer 110. One commercial example of some embodiments of robot(s) 130 is UiPath Robots™. In some embodiments, robots 130 install the Microsoft Windows® Service Control Manager (SCM)-managed service by default. As a result, such robots 130 can open interactive Windows® sessions under the local system account, and have the rights of a Windows® service.

In some embodiments, robots 130 can be installed in a user mode. For such robots 130, this means they have the same rights as the user under which a given robot 130 has been installed. This feature may also be available for High Density (HD) robots, which ensure full utilization of each machine at its maximum potential. In some embodiments, any type of robot 130 may be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. User mode robot services may be trusted with and manage the credentials for robots 130. A Windows® application may automatically be launched if the SCM-managed robot service is not installed.

Executors may run given jobs under a Windows® session (i.e., they may execute workflows. Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 130 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 110 may also be independent of browser zoom level in some embodiments. For applications that are DPI-unaware or intentionally marked as unaware, DPI may be disabled in some embodiments.

Figure 2:
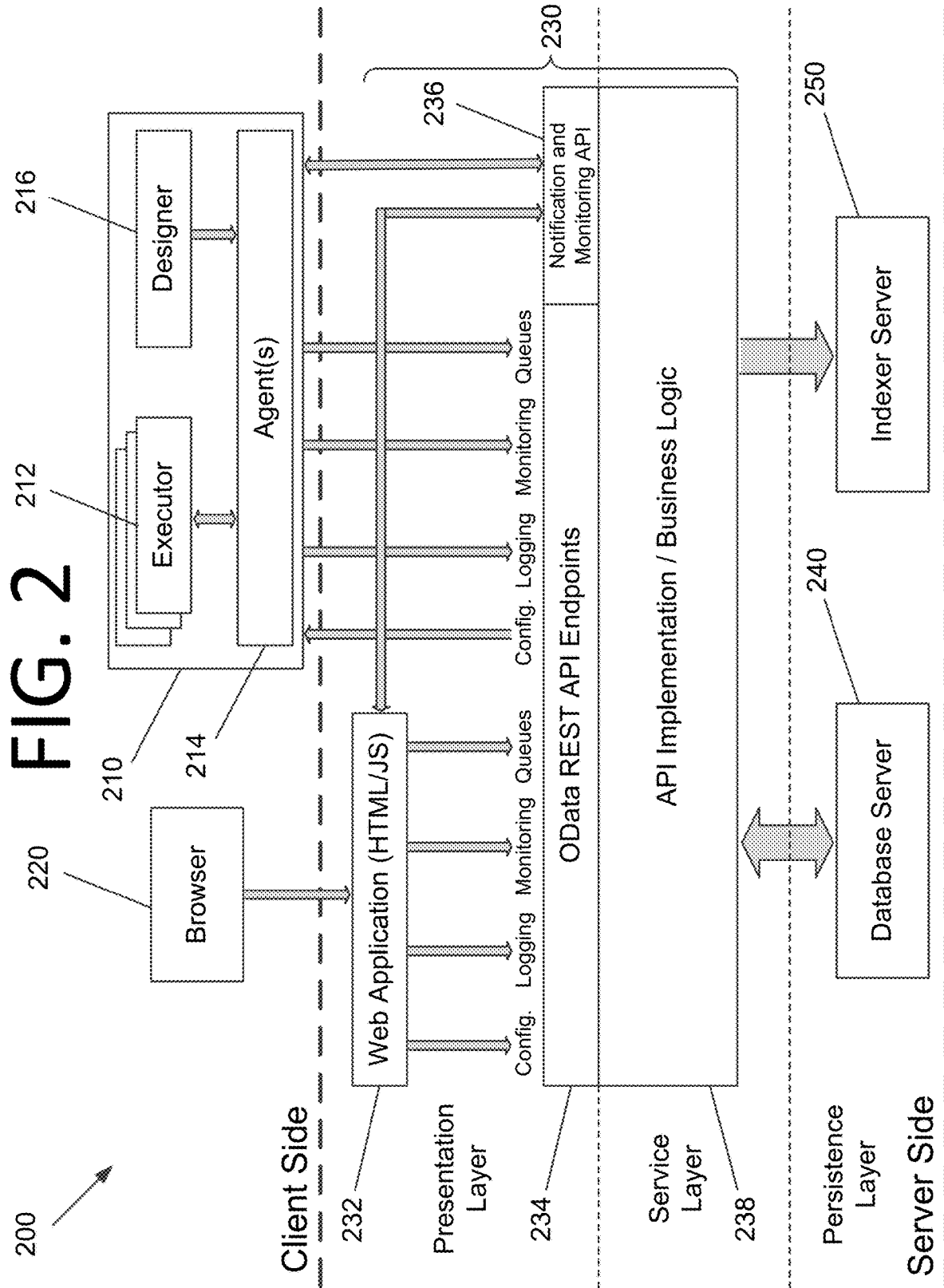
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, RPA system 200 may be, or may be a part of, RPA system 100 of FIG. 1. It should be noted that the client side, the server side, or both, may include any desired number of computing systems without deviating from the scope of the invention. On the client side, a robot application 210 includes executors 212, an agent 214, and a designer 216. However, in some embodiments, designer 216 may not be running on computing system 210. Executors 212 are running processes. Several business projects may run simultaneously, as shown in FIG. 2. Agent 214 (e.g., a Windows® service) is the single point of contact for all executors 212 in this embodiment. Process-specific messages in this embodiment are logged into conductor 230, which processes them further via database server 240, indexer server 250, or both. As discussed above with respect to FIG. 1, executors 212 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 may open a WebSocket channel that is later used by conductor 230 to send commands to the robot (e.g., start, stop, etc.).

On the server side, a presentation layer (web application 232, Open Data Protocol (OData) Representative State Transfer (REST) Application Programming Interface (API) endpoints 234, and notification and monitoring 236), a service layer (API implementation/business logic 238), and a persistence layer (database server 240 and indexer server 250) are included. Conductor 230 includes web application 232, OData REST API endpoints 234, notification and monitoring 236, and API implementation/business logic 238. In some embodiments, most actions that a user performs in the interface of conductor 230 (e.g., via browser 220) are performed by calling various APIs. Such actions may include, but are not limited to, starting jobs on robots, adding/removing data in queues, scheduling jobs to run unattended, etc. without deviating from the scope of the invention. Web application 232 is the visual layer of the server platform. In this embodiment, web application 232 uses Hypertext Markup Language (HTML) and JavaScript (JS). However, any desired markup languages, script languages, or any other formats may be used without deviating from the scope of the invention. The user interacts with web pages from web application 232 via browser 220 in this embodiment in order to perform various actions to control conductor 230. For instance, the user may create robot groups, assign packages to the robots, analyze logs per robot and/or per process, start and stop robots, etc.

In addition to web application 232, conductor 230 also includes service layer that exposes OData REST API endpoints 234. However, other endpoints may be included without deviating from the scope of the invention. The REST API is consumed by both web application 232 and agent 214. Agent 214 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 230. Queueing REST endpoints may be responsible for queues and queue item management, such as adding data to a queue, obtaining a transaction from the queue, setting the status of a transaction, etc.

Monitoring REST endpoints may monitor web application 232 and agent 214. Notification and monitoring API 236 may be REST endpoints that are used for registering agent 214, delivering configuration settings to agent 214, and for sending/receiving notifications from the server and agent 214. Notification and monitoring API 236 may also use WebSocket communication in some embodiments.

The persistence layer includes a pair of servers in this embodiment—database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 may manages queues and queue items. In some embodiments, database server 240 may store messages logged by the robots (in addition to or in lieu of indexer server 250).

Indexer server 250, which is optional in some embodiments, stores and indexes the information logged by the robots. In certain embodiments, indexer server 250 may be disabled through configuration settings. In some embodiments, indexer server 250 uses ElasticSearch®, which is an open source project full-text search engine. Messages logged by robots (e.g., using activities like log message or write line) may be sent through the logging REST endpoint(s) to indexer server 250, where they are indexed for future utilization.

Figure 3:
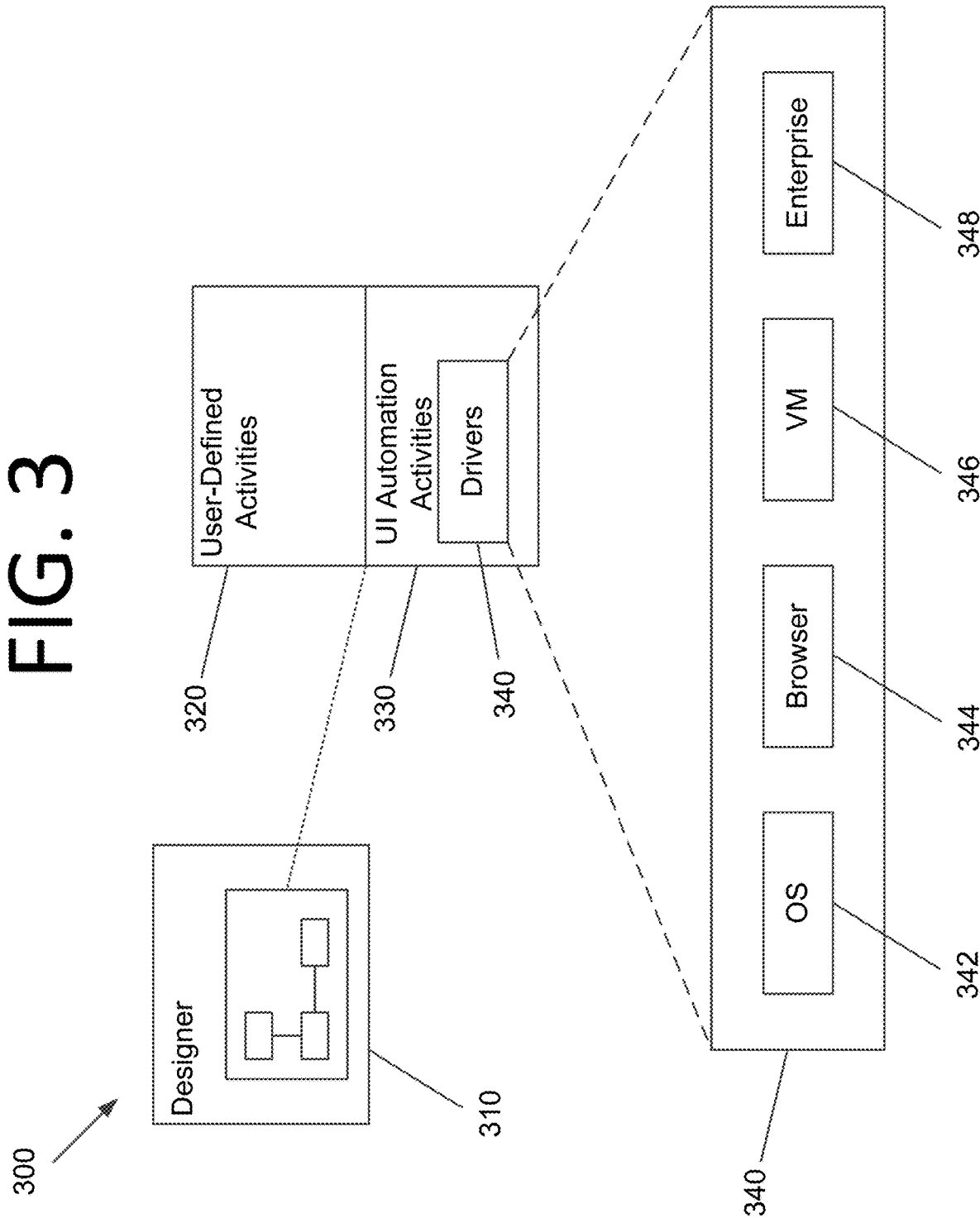
FIG. 3 is an architectural diagram illustrating the relationship between a designer, activities, and drivers, according to an embodiment of the present invention.

FIG. 3 is an architectural diagram illustrating the relationship 300 between a designer 310, activities 320, 330, and drivers 340, according to an embodiment of the present invention. Per the above, a developer uses designer 310 to develop workflows that are executed by robots. Workflows may include user-defined activities 320 and UI automation activities 330. Some embodiments are able to identify non-textual visual components in an image, which is called computer vision (CV) herein. Some CV activities pertaining to such components may include, but are not limited to, click, type, get text, hover, element exists, refresh scope, highlight, etc. Click in some embodiments identifies an element using CV, optical character recognition (OCR), fuzzy text matching, and multi-anchor, for example, and clicks it. Type may identify an element using the above and types in the element. Get text may identify the location of specific text and scan it using OCR. Hover may identify an element and hover over it. Element exists may check whether an element exists on the screen using the techniques described above. In some embodiments, there may be hundreds or even thousands of activities that can be implemented in designer 310. However, any number and/or type of activities may be available without deviating from the scope of the invention.

UI automation activities 330 are a subset of special, lower level activities that are written in lower level code (e.g., CV activities) and facilitate interactions with applications through the UI layer. In certain embodiments, UI automation activities 300 may simulate" user input through window messages or the like, for example. UI automation activities 330 facilitate these interactions via drivers 340 that allow the robot to interact with the desired software. For instance, drivers 340 may include OS drivers 342, browser drivers 344, VM drivers 346, enterprise application drivers 348, etc.

Drivers 340 may interact with the OS at a low level looking for hooks, monitoring for keys, etc. They may facilitate integration with Chrome®, IE®, Citrix®, SAP®, etc. For instance, the "click" activity performs the same role in these different applications via drivers 340.

Figure 4:
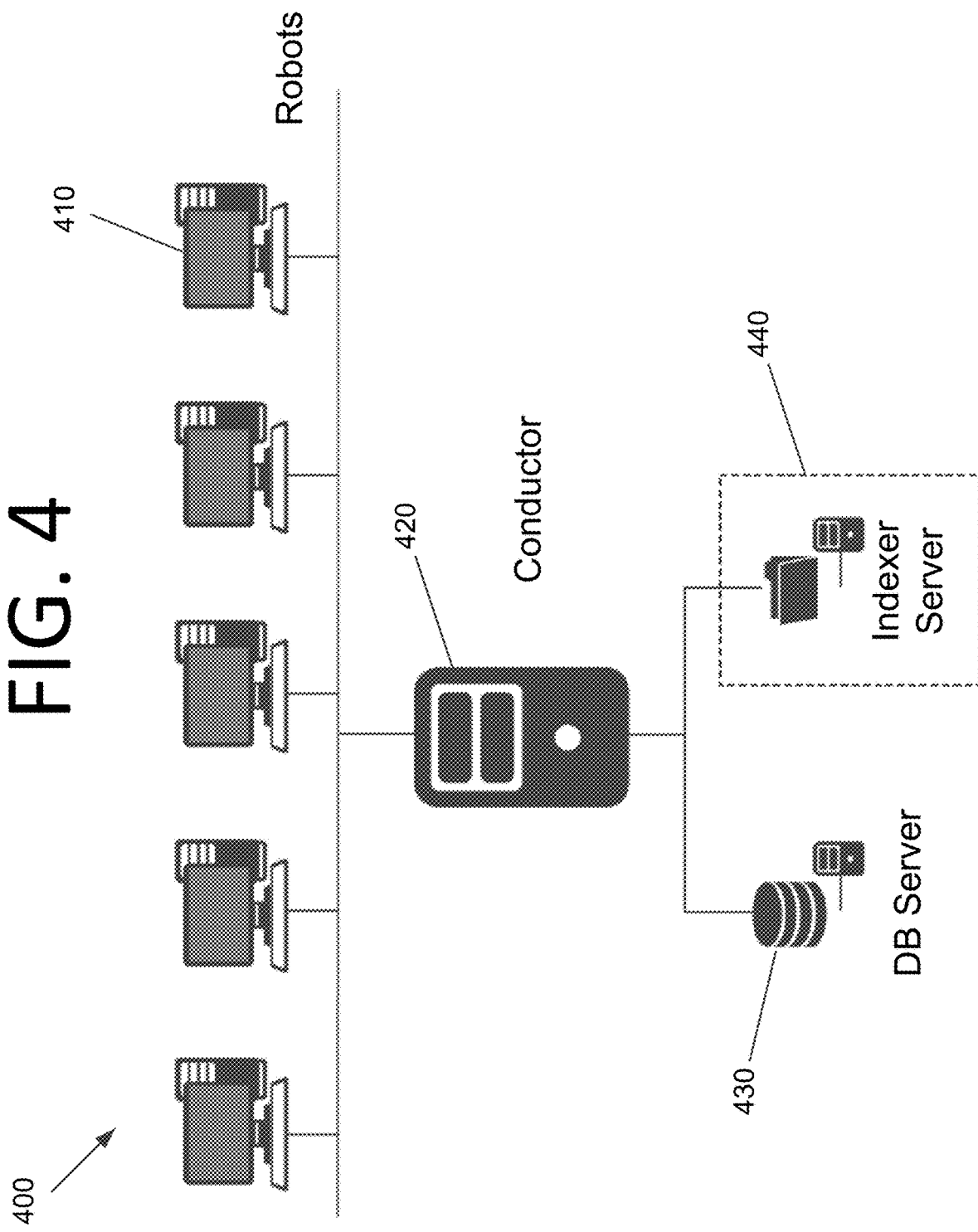
FIG. 4 is an architectural diagram illustrating an RPA system, according to an embodiment of the present invention.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 running robots. Computing systems 410 are able to communicate with a conductor computing system 420 via a web application running thereon. Conductor computing system 420, in turn, is able to communicate with a database server 430 and an optional indexer server 440.

With respect to FIGS. 1 and 3, it should be noted that while a web application is used in these embodiments, any suitable client and/or server software may be used without deviating from the scope of the invention. For instance, the conductor may run a server-side application that communicates with non-web-based client software applications on the client computing systems.

Figure 5:
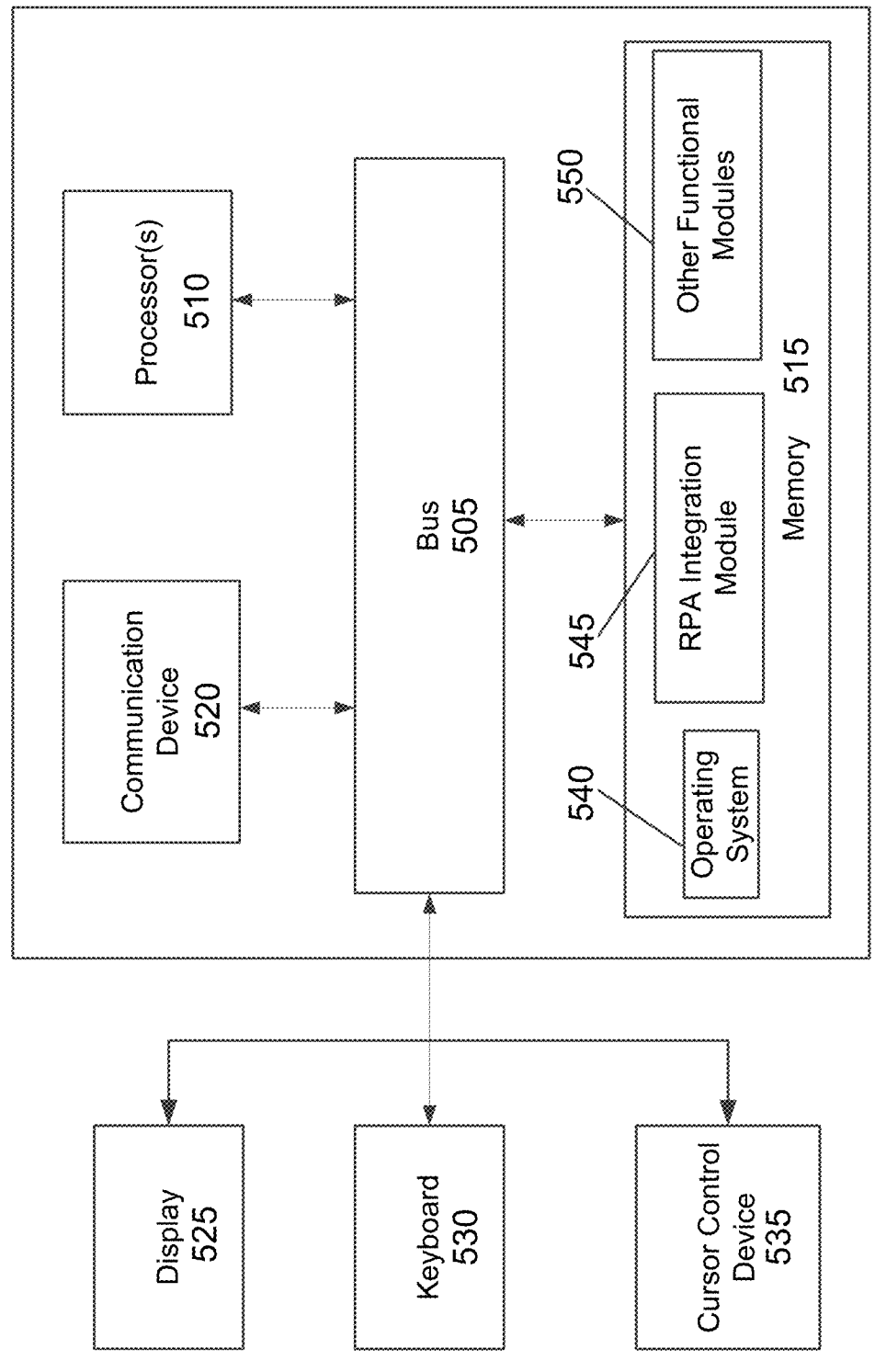
FIG. 5 is an architectural diagram illustrating a computing system configured to provide and/or execute an instance of an RPA-enabled application, according to an embodiment of the present invention.

FIG. 5 is an architectural diagram illustrating a computing system 500 configured to provide and/or execute an instance of an RPA-enabled application, according to an embodiment of the present invention. In some embodiments, computing system 500 may be one or more of the computing systems depicted and/or described herein. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beamsteering, a combination thereof, and or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system 500. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include an RPA integration module 545 that is configured to perform all or part of the processes described herein or derivatives thereof. Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 6A:
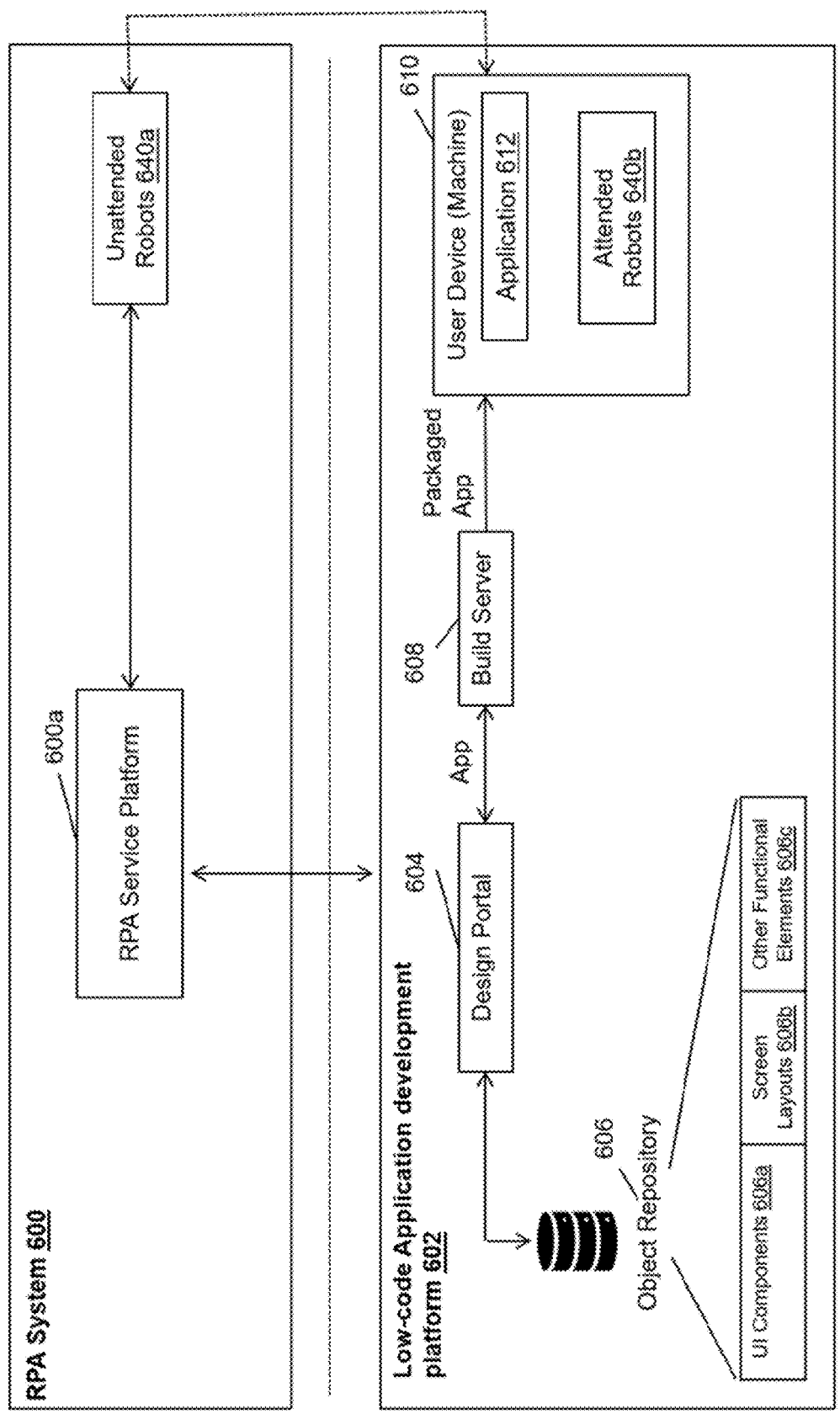
FIG. 6A is an architectural diagram illustrating a low-code application development platform integrated with an RPA system, according to an embodiment of the present invention.

FIG. 6A is an architectural diagram illustrating a low-code application development platform 602 integrated with an RPA system 600, according to an embodiment of the present invention. However, in some embodiments, RPA system 600 may not be present, and RPA-enabled application instance 612 may interact only with local robots (e.g., attended robots 640a). RPA system 600 includes an RPA service platform 600a and unattended robots 640a. Attended robots 640b are located on user device 610 (i.e., a computing system) and unattended robots 640a are operatively coupled with the RPA service platform 600a. In some embodiments, robot(s) from one or both of unattended robots 640a and attended robots 640b may be called by RPA-enabled application instance 612 on user device 610. In certain embodiments, a subset or all elements of application development platform 602 may be located on and/or the execution thereof caused by user device 610. In some embodiments, design portal 604, object repository 606, and build server 608 are used by a development computing system (not shown) before the RPA-enabled application is deployed to user device 610.

RPA system 600 may be implemented as a cloud-based infrastructure, an on-premise infrastructure, or a combination thereof. RPA service platform 600a may include one or more RPA processes that may be available as services. In some embodiments, architecture and functions of RPA service platform 600a may be or be realized by realized by a conductor (e.g., conductor 120 of FIG. 1), an action center (e.g., UiPath Action Center™), a container that holds items (e.g., UiPath Queues™), or any other suitable RPA service platform without deviating from the scope of the invention.

Application development platform 602 (e.g., a low-code application development platform) may be an application development environment that enables a user to build applications with little or no knowledge of a programming language and/or using code in isolation. As shown in FIG. 6A, application development platform 602 includes a design portal 604, an object repository 606, and a build server 608.

Object repository 606 includes UI components 606a, screen layouts 606b, and other functional elements 606c, such as widgets, templates, tables, functions, designs etc. Object repository 606 is used during development of an application to define and store a set of objects needed to build screens, UI components, and reports in some embodiments. Once object repository 606 is populated, a new application component can be developed by copying the requisite objects from object repository 606 in some embodiments. In addition to the development time saved by creating objects once, object repository 606 can be used to easily update application objects by using inheritance in some embodiments. When an object is copied from object repository 606, the copy, or child, may retain the property definitions of the original object (i.e., its parent) in some embodiments. If the properties of the parent object are changed in the in the repository, the properties that the child has inherited can also be updated automatically. Object repository 606 can provide consistency and control over the look and feel of the application and its data elements.

Design portal 604 may provide a collaborative environment for the design, development, and deployment of RPA-enabled applications. Design portal 604 may be used by developers to design an application using drag-and-drop functionality or other similar features in some embodiments. Design portal 604 may provide a workspace environment for building different features of the application and may include one or more features to connect with RPA service platform 600a and one or more user computing systems (e.g., user device 610).

Build server 608 may be a centralized, stable, and reliable environment for building distributed development projects. However, in some embodiments, no build server is needed and applications may be deployed using one-click deployment. Build server 608 may be configured to flag issues and notify developers conflicts exist or there are missing dependencies. Build server 608 may be further configured to mimic the environment of an end user. In this way, build server 608 can highlight the areas where local configurations of individual developers are causing the developed application to behave differently on their hardware than it would in production. Build server 608 may also speed the development process by freeing up resources on the local machines of developers in some embodiments.

In some embodiments, a developer accesses design portal 604 of application development platform 602 for developing an RPA-enabled application (also referred to as an "RPA application" herein). The RPA-enabled application may be a software application for a computing system (e.g., a desktop application, a web application, a smart phone application, a tablet application, a subcomponent of another application, etc.) integrated with an RPA process. Application development platform 602 may be a web-based application development platform or an application development platform that is installed on user device 610 in some embodiments. In certain embodiments, the developer may design the visual presentation of the application using UI components 606a, screen layouts 606b, and other functional components 606c from object repository 606 using drag-and-drop functionality and multiple functional components present in design portal 604, such as adding a new screen, connecting with RPA service platform 600a, obtaining a function, etc. Furthermore, the developer may request a connection between the application and RPA service platform 600a via a web server if RPA service platform 600a is a web-based application, or via an operating system if the RPA service platform 600a is a local application on the developer computing system, for example. The application may be connected to RPA service platform 600a after authorization using a tenant name, username, and password (or a hybrid where the application is on the cloud and the conductor is on premise), the connection between the application and RPA service platform 600a may be established automatically based on an already existing registration with RPA service platform 600a, etc.

Upon successfully connecting with RPA service platform 600a, the different processes and robots associated with RPA service platform 600a (e.g., unattended robots 640a) may be displayed in design portal 604, and one or more UI elements of the application may be linked with one or more RPA processes and unattended robots 640a associated with RPA service platform 600a and/or local attended robots 640b. The processes may include one or more RPA workflows. The selected RPA processes may be specified as "attended," "unattended," or "intelligent" by the developer during linking the processed with the robots in some embodiments.

At this stage, the RPA-enabled application is integrated with the RPA processes associated with RPA service platform 600a. Once the RPA-enabled application is linked with the one or more RPA processes, the RPA-enabled application is sent to build server 608 (if one is used—per the above, one-click deployment may be used in some embodiments), which performs aggregation of different instances of the RPA-enabled application (e.g., there might be a scenario where multiple developers are working on different features of the application, which will create different instances of the application), and compiles the RPA-enabled application to test whether it is operating correctly. If errors are found, an error report may be generated and shared with the developers. Build server 608 may also create deployment packages from artifacts (e.g., models, style sheets, custom JavaScript classes, etc.) in the RPA-enabled application on central repository for managing and versioning application models, where the application artifacts are versioned and stored in respective project folders.

In some embodiments, once the RPA-enabled application is linked with the one or more RPA processes, at least some of the above functionality of build server 608 may be skipped, and as such, build server 608 may be optional for some development scenarios. The RPA-enabled application (e.g., application instance 612) is then deployed to one or more user devices 610. The references to the one or more processes (such as a Process ID) may be stored as JavaScript Object Notation (JSON) objects in application instance 612 and/or application development platform 602.

Figure 6B:
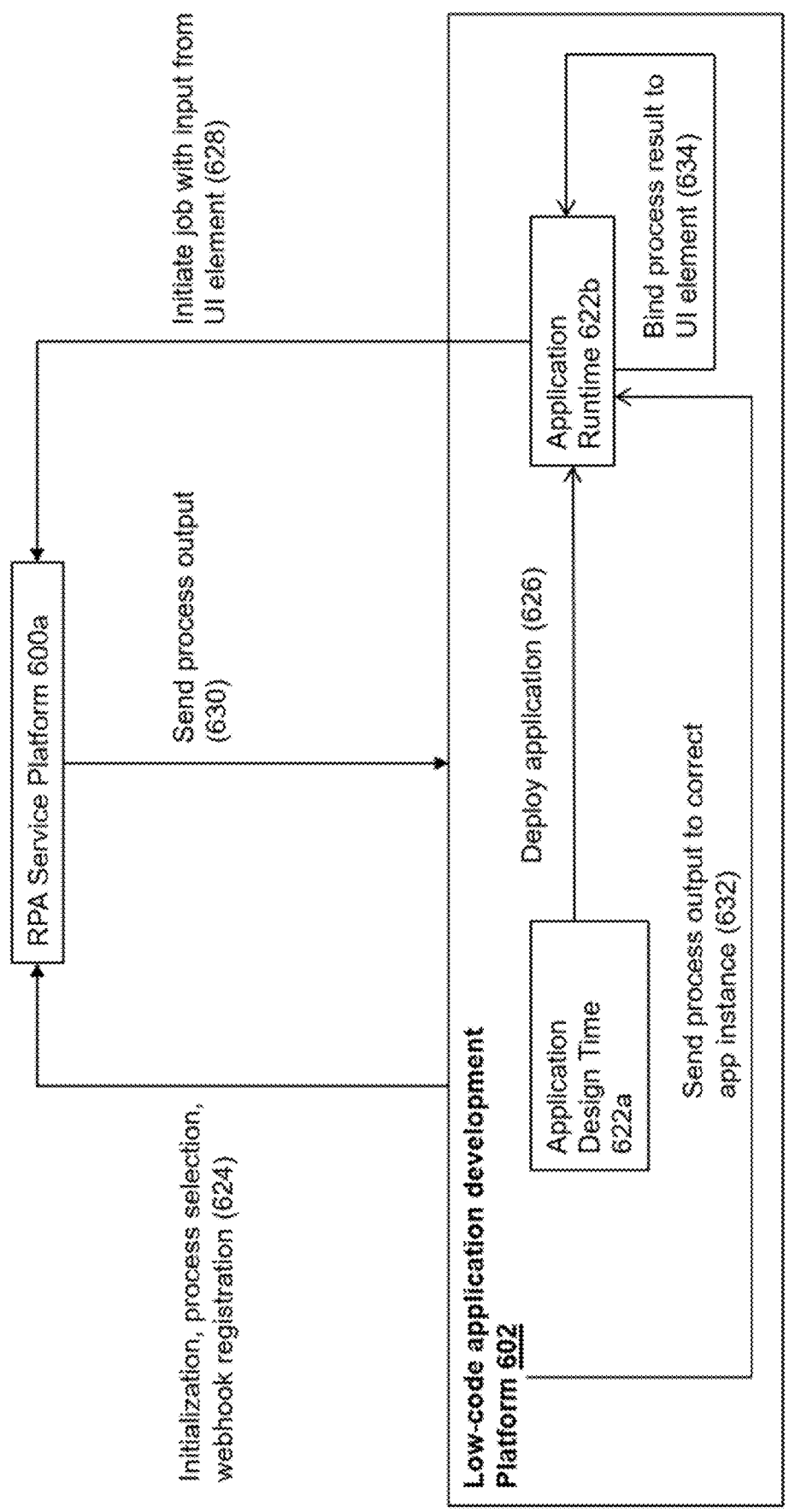
FIG. 6B illustrates interactions between the low-code application development platform and an RPA service platform during application design time and runtime, according to an embodiment of the present invention.

FIG. 6B illustrates interactions between low-code application development platform 602 and RPA service platform 600a during application design time and runtime, according to an embodiment of the present invention. In FIG. 6B, the RPA application developed using application development platform 602 (e.g., application instance 612) has a design time configuration 622a and a runtime configuration 622b. In some embodiments, a developer computing system (via design portal 604) may interact with RPA service platform 600a during application design time 622a and user computing system 610 (via RPA-enabled application instance 612) may interact with RPA service platform 600a at runtime 622b. Different steps may be involved during the design time the application and the runtime of the application. Application development platform 602 may create an application instance identifier (ID) for each application instance created using application development platform 602.

During design time 622a, application development platform 602 performs initialization, process selection, and webhook registration at 624 with RPA service platform 600a. The initialization may be performed by sending a connection request to RPA service platform 600a via a uniform resource locator (URL) of RPA service platform 600a for connecting the RPA application with RPA service platform 600a, and providing a tenant name, a username, and a password for authentication in some embodiments. Alternatively, the RPA application may be automatically connected based on the already existing registration of user device 610 with RPA service platform 600a. If user device 610 is already registered with RPA service platform 600a, then RPA service platform 600a may identify that the connection request is coming from a registered user device and promptly accept the request without further authentication.

Upon establishing the connection, the list of RPA processes, robots, and machines associated with RPA service platform 600a may be rendered on design portal 604. One or more RPA processes can be selected from the displayed list of RPA processes, and the selected RPA processes may be linked with one or more UI elements of the RPA application. The RPA processes may include an RPA workflow for completing a task or process or adding an available process to a queue of running RPA processes from RPA service platform 600a. The developer may assign the robot type (e.g., attended, unattended, or intelligent) to the selected RPA process during design time, and the selected RPA process may be linked to the robot for different functions, such as starting a job or adding an available process to a queue from the RPA service platform 600a.

A unique process ID may be generated for each selected RPA process associated with RPA service platform 600a. Application development platform 602 registers a webhook for each selected RPA process with RPA service platform 600a using the unique process ID. In some embodiments, application development platform 602 may register the unique process ID using a callback URL to RPA service platform 600a corresponding to the URL used during establishing of the connection with RPA service platform 600a. An input and output of the selected RPA process may be linked to the one or more UI elements of the application. The linking of the input and output of the selected RPA process to the one or more UI elements may be done using canvas controls associated with the application development in the design portal 604 in some embodiments. The output of the selected RPA process may be configured to provide either success or failure of the selected RPA process during runtime via the linked UI element. In case of failure, the output may show information indicating process failure along with a reason of failure and a suggestion to rectify the issue in some embodiments. The linked RPA processes may be stored as JSON objects in the application. Once the RPA application is developed and simulated, the RPA application is deployed at 626 on user device 610 as a docked .exe file or a web-based application in some embodiments. In certain embodiments, the RPA application is accessible via a URL to its production version.

During runtime 622b of the RPA application on user device 610, an application instance (e.g., application instance 612) is rendered on user device 610 that can interact with one or more attended robots (e.g., attended robots 640b) running locally on user device 610, unattended robots running remotely and accessible via RPA service platform 600a, or both, in some embodiments. In certain embodiments, when the user runs application instance 612, or application instance 612 is otherwise caused to run, the stored JSON objects are converted into JavaScript, the JavaScript is triggered by an input to the application (e.g., clicking a UI element, loading a screen, etc.), and a call is made to RPA service platform 600*a*. The one or more UI elements of application instance 612 are associated with one or more functions (interchangeably referred to herein as "jobs"), such as initiating a linked RPA process, getting a status of the linked RPA process during execution, etc. Accordingly, when a UI element is triggered or another RPA trigger occurs, a respective job may be initialized. A job ID may be generated with each initialized job. A process initiation request to initiate the job is made to RPA service platform 600*a* at 628. The request may include the application instance ID, the unique process ID, and the job ID.

RPA service platform 600*a* may identify the initialized RPA process based on the unique process ID provided in the registered webhook and assign a robot to execute the initialized RPA process. The assigned robot may be selected specifically or dynamically based on certain rules. Once the RPA process is completed, RPA service platform 600*a* sends the process output at 630 to application development platform 602, along with the application instance ID, the unique process ID, and the job ID. Alternatively, in some embodiments, RPA service platform 600*a* may send intermediate results, such as a status update of the RPA process, to application development platform 602 (e.g., to a developer computing system for design time or user device 610 for runtime), along with the application instance ID, the unique process ID, and the job ID. Such intermediate results and potentially any other desired communications at the start of the process, at the end of the process, or anywhere in between, may occur via IPC for locally executing robots. This IPC capability of some embodiments may be provided by default or may be available as an optional, user-selected feature. IPC may be bidirectional in some embodiments.

In certain embodiments, RPA service platform 600*a* may send the output directly to application instance 612 during runtime based on the application instance ID, the unique process ID, and the job ID. Application development platform 602 may identify application instance 612 from which the process initiation request was made based on the application instance ID and send the output to the correct application instance at 632. Application instance 612, upon receiving the output, binds the received output to the respective UI element at 634. The output may be displayed to the user via the application instance.

FIG. 7 is a flowchart illustrating a process 700 for developing an RPA application using an application development platform, according to an embodiment of the present invention. FIG. 7 is described in conjunction with the description of FIGS. 6A and 6B.

At step 702, a workspace is selected, by a user of an application development platform (e.g., application development platform 602), to create an RPA application. The RPA application may be, for example, a web application, a side bar application, a desktop application, a widget, a full screen application, an embedded application, an RPA robot, or any other suitable RPA-integrated application for any desired purpose without deviating from the scope of the invention. Application development platform 602 may include one or more design tabs in some embodiments. The one or more design tabs may include a component/design palettes tab that may include one or more design functions, such as label, table, list, button etc. The one or more design tabs may include a view tab (for example, a tree view tab) that may include a collection of different types of screen layouts. See screen layout 908 of FIG. 9A, for example. In order to select the workspace, application development platform 602 may receive a selection of a screen layout from the collection of screen layouts. A respective screen layout may be rendered on the screen for the development of the RPA application. The screen layout may be a visual model in which one or more UI elements of one or more user interfaces (e.g., UI components 606*a*) may be positioned. In some embodiments, application development platform 602 may generate an application instance ID for the RPA application while initiating the process of RPA application development. The application instance ID may be used to uniquely recognize each created RPA application. Alternatively, in some embodiments, the application instance ID may be given to the RPA application once the development of the RPA application is completed.

At step 704, one or more UI elements with the selected screen layout of the RPA application are embedded, such as by using drag-and-drop functionality, point-and-click functionality, user-specified formulas and expressions, or a combination thereof, of application development platform 602, if provided, to drag one or more design functions from the component tab and drop them on the layout. One or more design functions may be used to build the one or more user interfaces for the RPA application. Upon dropping the one or more design functions on the layout, the one or more UI elements of the one or more user interfaces may be embedded on the layout of the RPA application. For example, the one or more design functions, such as a clickable button, may be dragged from the component tab and dropped on the layout to create a button interface on the layout of the RPA application. Thus, application development platform 602 enables the user to create the RPA application with little or no coding knowledge.

At step 706, after creating the RPA application, a connection is established between the RPA application and RPA service platform 600*a* via application development platform 602. To establish the connection, the user may input an address (for example, a URL address) of RPA service platform 600*a* in application development platform 602 and enter user credentials. The address of RPA service platform 600*a* may be stored in memory by application development platform 602. Thus, the address of RPA service platform 600*a* may be fetched from memory. In some embodiments, the RPA service address may be detected based on the currently authenticated user on the platform (e.g., the user may select from available conductor services on his or her cloud account).

The user credentials may be authenticated before establishing the connection to RPA service platform 600*a* using user-provided credentials, such as a tenant name, username, and password. Application development platform 602 may determine the validity of the credentials by comparing the user provided credentials with pre-stored credentials of the user. Application development platform 602 may authenticate the user credentials to verify whether the user is authorized to establish the connection to RPA service platform 600*a*. For example, if the authorization of the user credentials fails, the connection to RPA service platform 600*a* may be denied by application development platform 602. Thus, application development platform 602 may prevent unauthorized users from using RPA service platform 600*a*. In some embodiments, the connection may be established using a single sign-on (SSO) or other authentication mechanism in which a user device that is registered with RPA service platform 600*a* can be automatically connected upon receiving the connection request without providing further details, such as the tenant name, username, and password.

The connection between the RPA application and RPA service platform 600*a* is established based on the entered URL of RPA service platform 600*a* and the successful authentication of the user credentials in some embodiments. In some embodiments, an application-level connection between application development platform 602 and RPA service platform 600*a* is created.

The connection between application development platform 602 and RPA service platform 600*a* may provide access to all or a subset of the RPA functionality of RPA service platform 600*a*, which may be fetched by the RPA application. For example, code application development platform 602 may fetch one or more RPA processes associated with desired RPA functionality from RPA service platform 600*a* for use by the RPA application.

At step 708, a list of one or more RPA processes available in RPA service platform 600*a*, locally on a user machine that will execute an instance of the RPA application, or both, is displayed on application development platform 602. See RPA process list 914 of FIG. 9D. For example, application development platform 602 may be configured to display the list of RPA processes fetched from RPA service platform 600*a* based on the connection established with RPA service platform 600*a*. These processes may be associated with unattended robots accessible via RPA service platform 600*a*, and in some embodiments, may include attended robots available on local machine(s) to which the RPA application is to be deployed. In certain embodiments, attended robot processes are provided via connection(s) to the local machine(s). Application development platform 602 may also be configured to display one or more parameters associated with at least one RPA process of the list of the one or more RPA processes.

At step 710, application development platform 602, receives at least one RPA process selection from the displayed list of RPA processes to be called via interaction with a UI element or another trigger (e.g., those via available via RPA service platform 600*a*, those available on user device 610, or both). At step 712, at least one selected RPA process is integrated with the RPA application (e.g., with at least one UI element of one or more user interfaces, with a variable change, with a trigger event or status change, etc.) using drag-and-drop functionality or other linking capabilities, for example.

Application development platform 602 may generate a unique process ID for each selection and allocation of at least one RPA process. In some embodiments, the user may select at least one RPA process from the displayed list of RPA processes. The user may also select one or more parameters associated with at least one RPA process in certain embodiments. RPA service platform 600*a* may assign an unattended robot for each of the selected RPA processes in some embodiments. The robot may be assigned specifically or dynamically based on a set of rules. Each of the selected RPA processes linked to the robot(s) may be stored in the RPA application as JSON objects. In some embodiments, the one or more UI elements may also be configured to make application programming interface (API) calls for the respective one or more RPA processes.

At step 714, application development platform 602 sends a notification to RPA service platform 600*a* for each selected RPA process to be executed by unattended RPA robot(s), if unattended robots are to be used. In some embodiments, a check for a webhook to the at least one RPA process may be performed. If a webhook exists, the RPA process is already registered in RPA service platform 600*a*. If the webhook is not found, a new webhook may be created and stored in RPA service platform 600*a*, including a list of the selected RPA processes and allocated robots. The notification may include the generated unique process ID for each RPA process, which is shared with RPA service platform 600*a*. Thus, RPA service platform 600*a* may be updated regarding each of the selected RPA processes and allocated robots. The notification may be sent to RPA service platform 600*a* based on the address of RPA service platform 600*a* (e.g., a callback URL) in some embodiments.

Each UI element integrated with RPA process(es) may be a trigger point to initiate the task associated with the RPA process(es) allocated to assigned robot(s) in some embodiments. JavaScript for the UI element may be linked to the RPA process that gets triggered based on the input, a call is made from the RPA application to RPA service platform 600*a* and from RPA service platform 600*a* to the assigned robot using standard APIs for unattended robots, and the RPA process associated to that UI element is run. In embodiments where an attended robot resides locally on the same computing system as the RPA process, the call may be made to the robot directly rather than to RPA service platform 600*a* via IPC, for example. The output of the RPA process may be shown on a display associated with user device 610.

At step 716, the developed RPA application is deployed to a machine (e.g., user device 610) to run and control or call the associated one or more processes running locally on that machine and/or running remotely. The RPA application may be configured to be displayed parallel to other applications on user device 610 without interrupting the operation of the other applications. In a nonlimiting example, the RPA application may be a web application rendered as a side bar application on the display of or associated with user device 610. The side-bar application may be provided as a .exe file docked on the screen of the user device for easy accessibility. The user may control the attended robots running locally by the RPA application without pausing ongoing work on already running applications. In some embodiments, unattended robots running remotely may be controlled. In certain embodiments, the user may not need not to navigate through multiple windows to access different attended robots running locally on user device 610. Instead, the user may easily access and control all attended robots running locally via the RPA application.

FIG. 8 is a flowchart illustrating a process for execution of the RPA application, according to an embodiment of the present invention. FIG. 8 is described in conjunction with the description of FIGS. 6A and 6B.

At step 802, an instance of the RPA application (e.g., instance 612) is run on user device 610. In attended scenarios where the RPA robot is local to user device 610, after running the selected RPA application, an input may be received via the one or more UI elements of the RPA application or some other trigger. In certain embodiments, event-based triggers to RPA processes may be received from the RPA application, such as a trigger generated when a condition is satisfied (e.g., a process is completed, a parameter changes or becomes a certain value, an event such as screen loading, a control change, a button click, etc.). When the user runs the RPA application, JSON objects associated with the one or more RPA processes may be converted to JavaScript output in some embodiments.

At step 804, one or more RPA processes are initiated. The one or more RPA processes may be initiated based on an interaction with a UI element, an event-based trigger, etc. For attended robots, the RPA application may start RPA process(es) for attended RPA robot(s) locally. For unattended robots, the RPA application may start RPA process (es) via RPA service platform 600a, or may fetch the status of the one or more associated RPA processes based on an event. For unattended robots, upon initiation, a request is sent to RPA service platform 600a to run at least one process associated with a UI element that received the input or based on an event. As the input triggers the JavaScript, a call may be made from the RPA application to RPA service platform 600a, and from RPA service platform 600a, the respective unattended robots for running the respective one or more RPA processes may be called. In some embodiments, application development platform 602 may generate a job ID for each request made to RPA service platform 600a for initiating an RPA process. The generated job ID may be stored by application development platform 602, along with the respective application instance ID for further reference. The request sent to RPA service platform 600a may include the job ID related to the request for initiating the RPA process, the application instance ID related to RPA application instance 612, the unique process ID related to the initiated RPA process, and other information related to the RPA process (e.g., user system identifiers, user credentials, and the like). RPA service platform 600a may refer to a registered webhook and assign an unattended robot to at least one process based on the unique process ID and the job ID.

At step 806, for unattended robots, a notification is obtained by application development platform 602 from RPA service platform 600a indicating completion of at least one RPA process. Thus, application development platform 602 may be informed in real time or near-real time regarding the status of the at least one RPA process.

At step 808, application development platform 602 receives the output from RPA service platform 600a, which is generated by the at least one RPA process. The generated output may include a message indicating the outcome of the at least one RPA process a status of the at least one RPA process, etc. For example, the output may include indications of success, failure, errors, a result after running the process, an indication that another RPA process was run upon completion of the initiated RPA process, etc. In some embodiments, this output may be routed directly to RPA application instance 612.

At step 810, the output for attended or unattended robot execution is routed via IPC or low-code application development platform 602, respectively, to the application instance that initiated the RPA process(es) (e.g., application instance 612). For unattended robot execution, this may be accomplished based on the application instance ID, the unique ID, and the job ID. The unique ID, the application instance ID, and the job ID, or respective information received via IPC or stored locally for application instance 612, may be used to further route the output to one or more UI elements that should display the output. Application development platform 602 may bind the output to one or more UI elements of the RPA application in some embodiments.

At step 812, if a UI element is to be modified based on robot execution results, the output is rendered via the one or more UI elements of the RPA application instance.

Figure 9A:
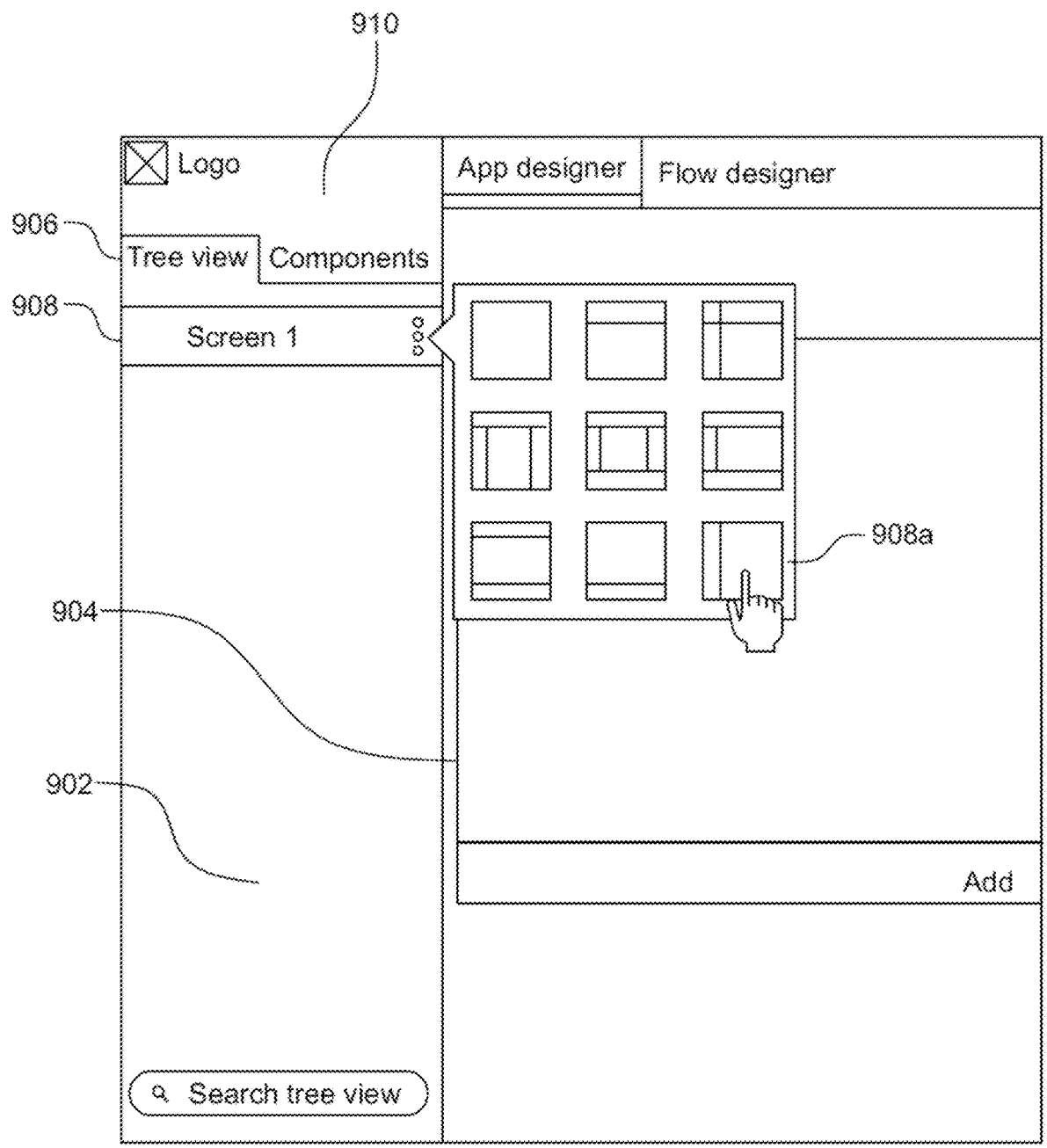

FIGS. 9A-9E collectively illustrate plurality of user interfaces (UIs) showing a design time environment and runtime environment for an RPA application integrated with an RPA service platform, according to an embodiment of the present invention. In some embodiments, application development platform 602 may be used to create the RPA application. The low-code application development platform may include various design tools and drag-and-drop functionality to create the RPA application. In FIG. 9A, the application development platform includes a design tools section 902 and a design section 904 including a workspace to design the RPA application. Design tools section 902 includes tree view tab 906 and components tab 910. Tree view tab 906 may include various options to design the RPA application, such as a collection of different types of screen layouts 908. Upon receiving a selection of at least one screen layout, such as screen layout 908a, the selected screen layout is used for creating a design of the workspace of the RPA application. The screen layout may also represent a visual presentation of the RPA model when the RPA application is accessed at the deployed system. For example, upon selecting a screen layout such as screen layout 908a, the RPA application may be rendered on the left side of the user device as a side bar application, for example. However, any application type and location may be implemented without deviating from the scope of the invention. Design section 904 may allow the developer to preview the visual appearance of the RPA application as it will be rendered on the user device (e.g., user device 610), and the developer may also embed functional elements within the workspace to provide different functionality to the application. Design section 904 may change the visual representation of the workspace area according to the selected screen layout.

Figure 9B:
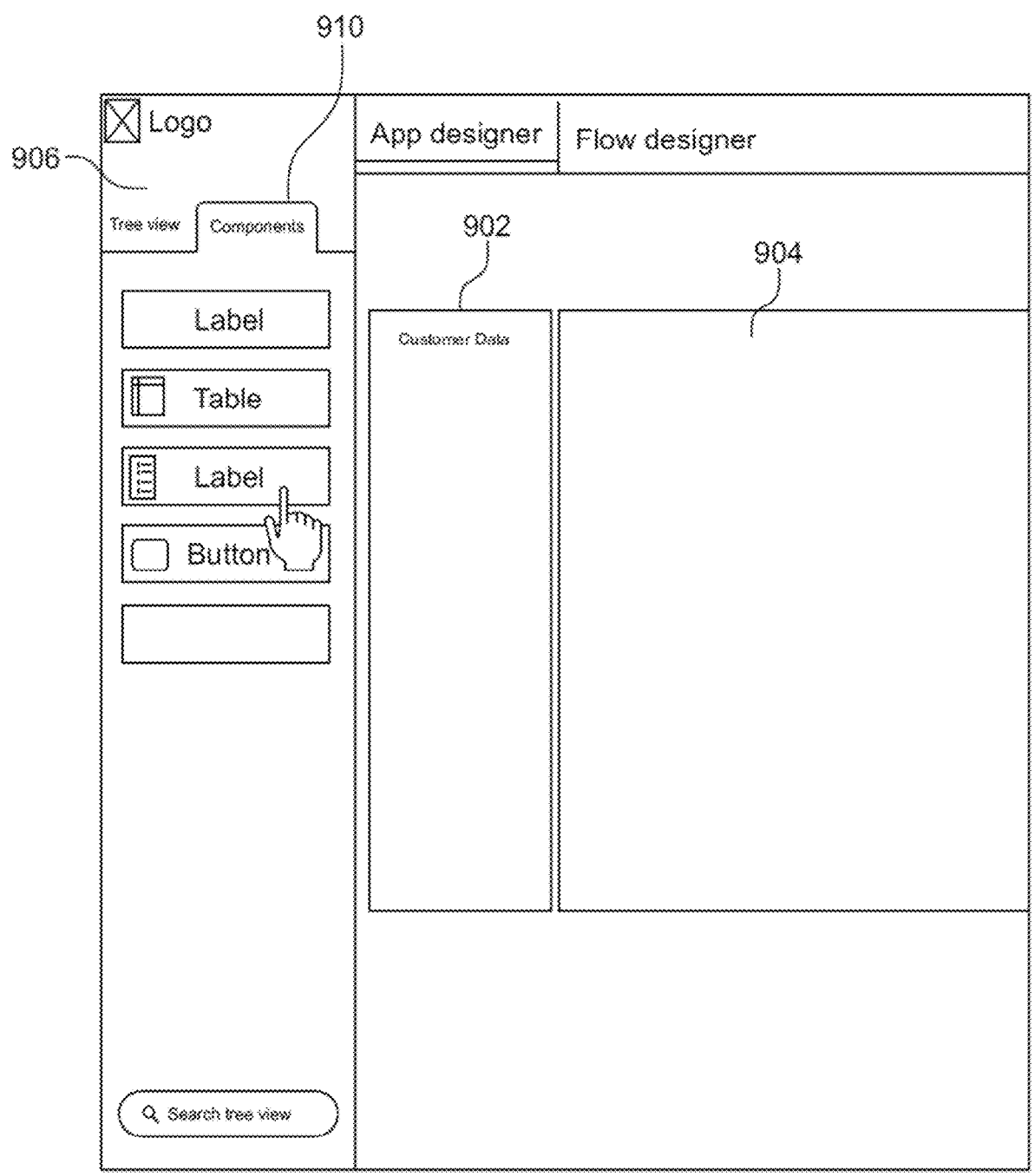

Components tab 910 may include one or more design functions, such as a label, a table, a list, a button, etc., as shown in the FIG. 9B. The design functions may be used to build one or more user interfaces for the RPA application. For example, the label function may be used to add a text label in the RPA application, which provides a name to a function associated with the label. For instance, a label "customer data" may be provided for a function that returns profile-related data for a customer. The table function may be used to create table fields in the RPA application. The list function may be used to add a series of text boxes such that a list of data may be input or output in the RPA application. In some embodiments, the list function may be associated specifically with the label function. For example, a list of functions, such as billing history, update plan, etc., may be linked specifically to label customer data. The button function may be used to add a button to the RPA application. Each design function may be associated with RPA functionality upon being added in the RPA application. The user may use the drag-and-drop functionality of the low-code application development platform to add the design functions to the RPA application. For example, the user may drag a design function from design tools section 902 and drop the design function in the workspace of the RPA application. Similarly, the RPA application may be built with one or more design functions. Thus, the low-code application development platform may enable the user to build the RPA application with little or no coding knowledge.

Further, the one or more user interfaces built using the one or more design functions may be associated with one or more RPA functions. The low-code application development platform may connect to an RPA service platform, such as RPA service platform 600a, to access one or more RPA functions for unattended robots associated with the RPA service platform. Additionally, or alternatively, the low-code application development platform may provide attended robot functionality for attended robots on the user device. The RPA service platform may include one or more RPA processes associated with the RPA functionality.

Figure 9C:
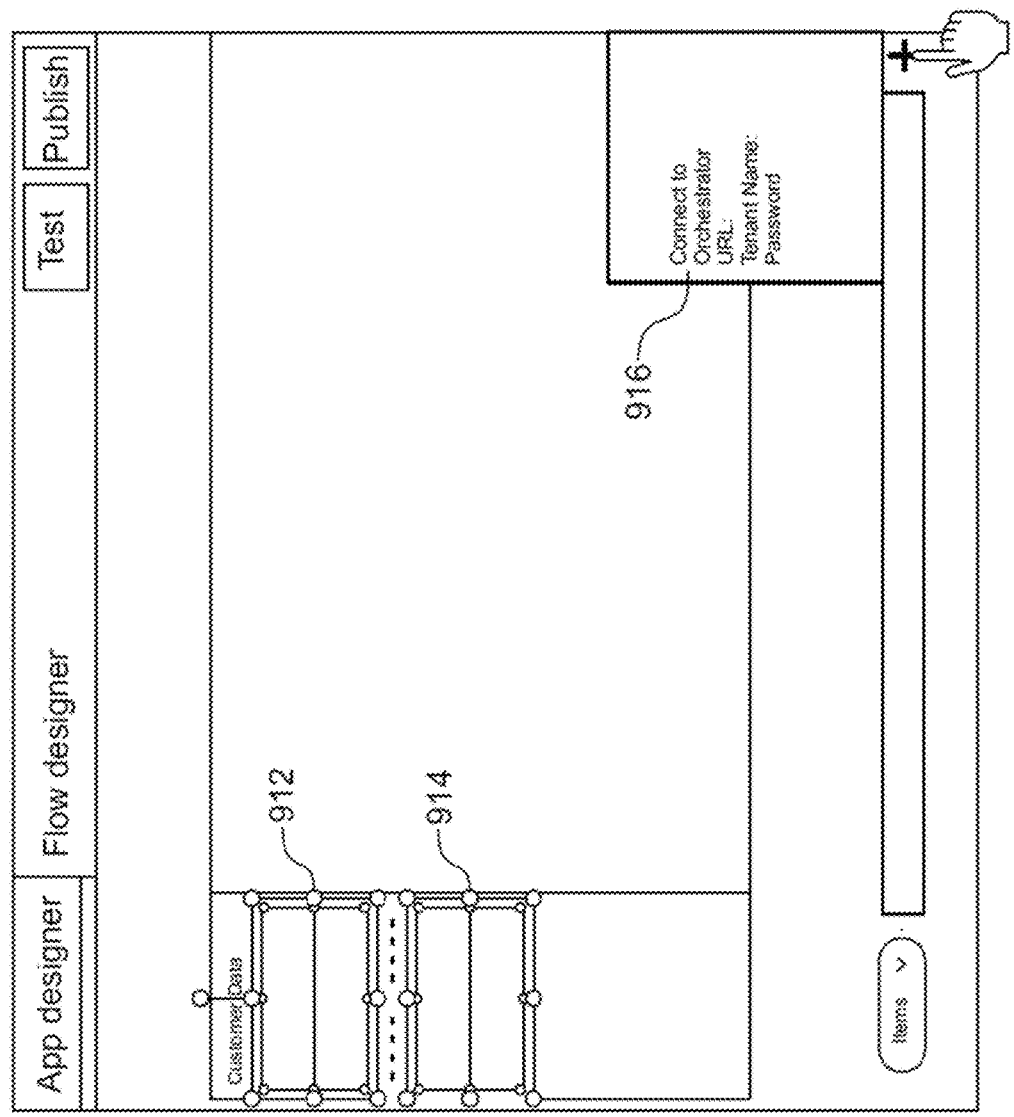

As shown in FIG. 9C, the icon "+" is used to initiate a connection process with the RPA service platform. When the developer clicks on the "+" icon, a window 916 is rendered on design section 904 that includes input fields, such as the URL of the RPA service platform, the tenant name of the low-code application development platform, and the user password. Upon submitting the details in the input field, the low-code application development platform is connected with the RPA service platform. The process of connecting to the orchestrator may be a one-time authentication process in some embodiments.

In some embodiments, when the low-code application development platform is already connected to an RPA service platform, the clicking on the "+" icon may also give the option to "continue with the existing RPA service platform" or "add a new RPA service platform connection". Selection of the option "continue with the existing RPA service platform" may provide a list of available RPA processes associated with the respective RPA service platform without an authentication step, whereas selection of the option "add a new RPA service platform connection" may prompt the user to provide the connection information, such as the URL of the RPA service platform, the tenant name of the low-code application development platform, and the user password for the one time authentication process. In certain embodiments, when the low-code application development platform is already connected to a RPA service platform, the clicking on the "+" icon may show the available RPA processes associated with the RPA service platform. The RPA service platform may have the capability to trigger the unattended robots to execute the one or more RPA processes associated with the RPA functionality.

Upon connecting to the RPA service platform, the low-code application development platform may display a list of RPA processes 918, as shown in FIG. 9D. The user may select at least one RPA process from the displayed list of RPA processes 914. The selected RPA process may be associated with one or more UI elements of the one or more user interfaces of the RPA application, such as UI elements 912 and 914. The user may associate at least one RPA process from the list of RPA processes 918 to one or more UI elements by using drag-and-drop functionality of the low-code application development platform. Thus, the RPA application may be associated with RPA functionality, and further, may be able to handle RPA workflows locally.

The RPA application may be rendered on a user device, such as user device 610. The RPA application may function simultaneously with one or more applications rendered on the same user device. For example, RPA application 920 is functional simultaneously with other applications rendered simultaneously in main window 922, as shown in the FIG. 9E. The user may use RPA-enabled UI elements to invoke RPA processes associated therewith.

In some embodiments, the user may provide input to one or more RPA-enabled UI elements. This may occur in a similar manner to that of process 800 of FIG. 8. The output from execution of the RPA robot(s) may be rendered on the user device through a pop-up window 924, as shown in FIG. 9E.

FIG. 10 is a flowchart illustrating a process 1000 for developing an RPA-enabled application, according to an embodiment of the present invention. At 1002, one or more UI elements associated with a user interface of an RPA application are created using drag-and-drop functionality of an application development platform. At 1004, the RPA application is optionally connected to an RPA service platform (e.g., RPA service platform 600a). This may be done to obtain RPA processes for unattended RPA robots. At 1006, UI elements and/or other triggers to be RPA-enabled in RPA application are linked with the one or more respective RPA processes for attended (local) and/or unattended (remote) RPA robots. At 1008, an instance of the RPA application is rendered on a user device.

Figure 11:
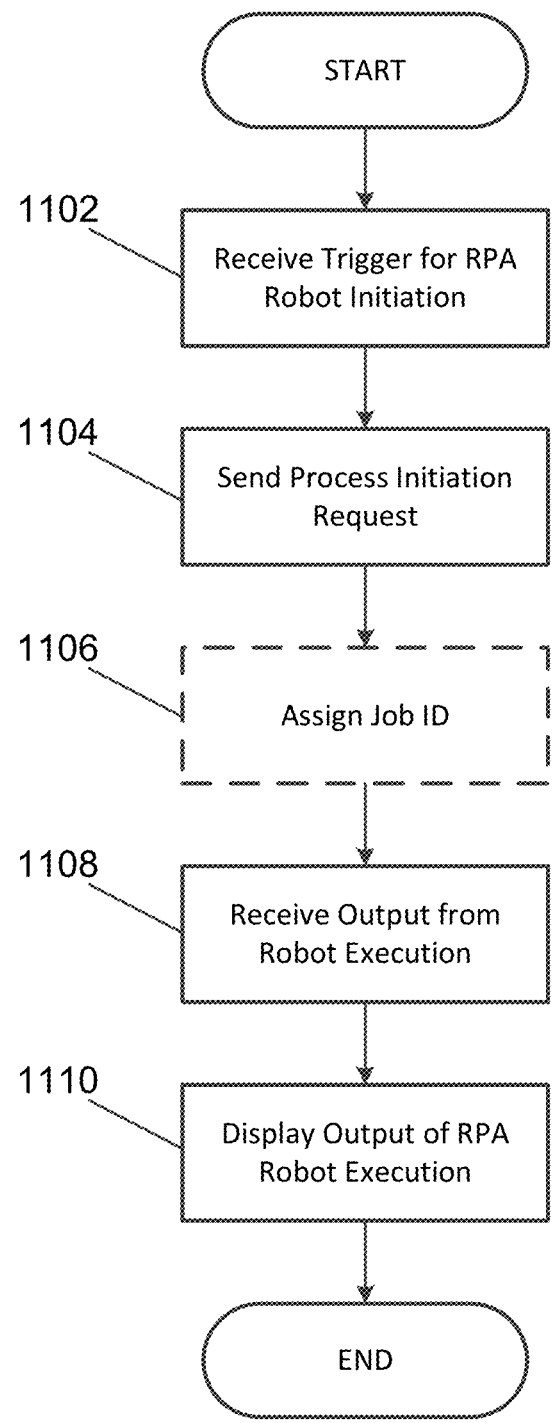
FIG. 11 is a flowchart illustrating a process for executing an RPA-enabled application, according to an embodiment of the present invention.

FIG. 11 is a flowchart illustrating a process 1100 for executing an RPA-enabled application, according to an embodiment of the present invention. In some embodiments, process 1000 of FIG. 10 may be performed prior to process 1100 of FIG. 11 to create the RPA-enabled application. At 1102, the RPA application receives a trigger for initiation of an RPA robot to perform a task. The trigger may be due to a user interacting with an RPA-enabled UI element of the RPA application, an event occurring, a variable being set to a certain value, etc. At 1104, the RPA application sends a process initiation request to an RPA service platform for an unattended robot or to a locally executing attended robot via IPC. The process initiation request may include a request to run a process integrated with an RPA-enabled UI element that received a user interaction or input in some embodiments. At 1106, a job ID may be assigned to the process initiation request for unattended RPA robot execution. At 1108, output generated from running the process by the RPA robot is received from the robot via IPC, written to a file, retrieved from a database, etc. for an attended RPA robot or received from the RPA service platform for an unattended RPA robot. In some embodiments, the unattended robot may send output directly to the instance of the RPA-enabled application. At 1110, the output from the RPA robot execution is displayed in the RPA application.

FIG. 12 is a flowchart illustrating a process 1200 for searching for attended or unattended RPA robots to perform an RPA process and executing the RPA process, according to an embodiment of the present invention. In some embodiments, process 1000 of FIG. 10 may be performed prior to process 1200 of FIG. 12 to create the RPA-enabled application. In some embodiments, process 1200 may be used to implement intelligent robot selection of an intelligent robot selection option selected in an application development platform for an RPA-enabled application. The process begins with receiving a trigger for RPA robot initiation or interaction at 1202. The trigger may be due to a user interacting with an RPA-enabled UI element of the RPA application, an event occurring (e.g., an event in the RPA-enabled application or another application, the computing system on which the RPA application is executing, or a remote computing system), a variable being set to a certain value or changing to a certain value, or any other suitable trigger without deviating from the scope of the invention.

The RPA-enabled application then searches locally for an attended robot for a process at 1204. If a local attended robot is found at 1206, the RPA-enabled application executes or causes the execution of the attended robot at 1208. Communications between the RPA-enabled application and the attended robot may occur via IPC in some embodiments.

If a suitable attended robot for the RPA process was not found at 1206, the RPA-enabled application queries an RPA service platform for an unattended robot for the RPA process at 1210. If a suitable unattended robot is found at 1212, the RPA-enabled application causes execution of the unattended robot via the RPA service platform and communicates with the RPA service platform at 1214 (e.g., via an Internet connection using TCP/IP, HTML, via an Intranet or LAN, etc.). In some embodiments, where the RPA-enabled application is to display information during attended or unattended robot execution and/or after attended or unattended robot execution, certain graphical elements of the RPA-enabled application may be updated to display this information at 1216. However, if no suitable unattended robot was found at 1212, the RPA-enabled application throws an exception at 1218 and the process ends.

The process steps performed in FIGS. 7, 8, and 10-12 may be performed by a computer program, encoding instructions for the processor(s) to perform at least part of the process(es) described in FIGS. 7, 8, and 10-12 in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIGS. 7, 8, and 10-12, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments. Furthermore, the terms "a" and "an" herein do not denote a limitation of quantity, but rather, denote the presence of at least one of the referenced items.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method for developing a robotic process automation (RPA)-enabled application, comprising:
    linking a trigger in the RPA-enabled application to an RPA process to be executed by an RPA robot, by a development application;
    setting a robot type variable for the trigger to intelligent, by the development application;
    generating an instance of the RPA-enabled application comprising the linked trigger, by the development application; and
    deploying the instance of the RPA-enabled application to a computing system, by the development application, wherein the RPA-enabled application is configured to initialize, call, or otherwise interact with one or more RPA robots during its execution via the linked trigger, the RPA process is external to the RPA-enabled application, and
    the intelligent robot type variable causes the RPA-enabled application to first search for a local attended RPA robot to complete a task, and when not found, to search for a remote unattended RPA robot to complete the task.

2. The computer-implemented method of claim 1, wherein the trigger comprises a user interaction with a user interface (UI) element, an event occurring in the RPA-enabled application or another application, an event occurring in the computing system to which the RPA-enabled application is deployed or a remote computing system, a variable of the RPA-enabled application, a variable of another application, a variable of an RPA robot, a variable of an operating system, or a combination thereof.

3. The computer-implemented method of claim 1, wherein the development application comprises drag-and-drop functionality, point-and-click functionality, user-specified formulas and expressions, or a combination thereof, for placing user interface (UI) elements in a UI of the RPA-enabled application.

4. The computer-implemented method of claim 1, wherein the development application is or comprises an RPA development platform.

5. The computer-implemented method of claim 1, wherein the RPA robot is an attended RPA robot executed on the computing system to which the RPA-enabled application is deployed or an unattended robot accessible remotely by the RPA-enabled application via an RPA service platform.

6. The computer-implemented method of claim 1, further comprising:
receiving the trigger for initiation of the RPA process, by the RPA-enabled application;
when the RPA-enabled application determines that the RPA process is to be executed by an unattended RPA robot:
sending a process initiation request to an RPA service platform, and
receiving output generated from running the RPA process from the RPA service platform for the unattended RPA robot; and
when the RPA-enabled application determines that the RPA process is to be executed by a locally running attended RPA robot:
sending the process initiation request to the locally executing attended RPA robot via Inter-Process Communication (IPC), and
receiving output generated from running the RPA process from the attended robot via IPC.

7. The computer-implemented method of claim 6, further comprising:
displaying results from the output generated from running the process in a user interface (UI), by the RPA-enabled application.

8. The computer-implemented method of claim 1, wherein:
the development application comprises logic for determining the intelligent robot type.

9. The computer-implemented method of claim 8, wherein when the robot type variable for the trigger is set to intelligent, the method further comprises:
receiving the trigger for initiation of the RPA process, by the RPA-enabled application;
searching locally for an attended robot for the RPA process, by the RPA-enabled application; and
when a suitable local attended robot is found for the RPA process, causing the attended robot to execute the RPA process, by the RPA-enabled application.

10. The computer-implemented method of claim 9, wherein when the suitable local attended robot is not found for the RPA process, the method further comprises:
querying an RPA service platform for a suitable unattended robot for the RPA process, by the RPA-enabled application; and
when the suitable unattended robot is found for the RPA process, causing execution of the unattended robot, by the RPA-enabled application.

11. A computer program for developing a robotic process automation (RPA)-enabled application embodied on a non-transitory computer-readable medium, the program configured to cause at least one processor to:
link a trigger in the RPA-enabled application to an RPA process to be executed by an RPA robot;
set a robot type variable for the trigger to intelligent;
generate an instance of the RPA-enabled application comprising the linked trigger; and
deploy the instance of the RPA-enabled application to a computing system, wherein the RPA-enabled application is configured to initialize, call, or otherwise interact with one or more RPA robots during its execution via the linked trigger,
the RPA process is external to the RPA-enabled application, and the intelligent robot type variable causes the RPA-enabled application to first search for a local attended RPA robot to complete a task, and when not found, to search for a remote unattended RPA robot to complete the task.

12. The computer program of claim 11, wherein the trigger comprises a user interaction with a user interface (UI) element, an event occurring in the RPA-enabled application or another application, an event occurring in the computing system to which the RPA-enabled application is deployed or a remote computing system, a variable of the RPA-enabled application, a variable of another application, a variable of an RPA robot, a variable of an operating system, or a combination thereof.

13. The computer program of claim 11, wherein the development application comprises drag-and-drop functionality, point-and-click functionality, user-specified formulas and expressions, or a combination thereof, for placing user interface (UI) elements in a UI of the RPA-enabled application.

14. The computer program of claim 11, wherein the program is or comprises an RPA development platform.

15. The computer program of claim 11, wherein the RPA robot is an attended RPA robot executed on the computing system to which the RPA-enabled application is deployed or an unattended robot accessible remotely by the RPA-enabled application via an RPA service platform.

16. The computer program of claim 11,
the program comprises logic for determining the intelligent robot type.

17. A computer program embodied on a non-transitory computer-readable medium, the program configured to cause at least one processor to:
receive a trigger for initiation of a robotic process automation (RPA) process to be executed by an RPA robot;
when the RPA-enabled application determines that the RPA process is to be executed by an unattended RPA robot:
send a process initiation request to an RPA service platform, and
receive output generated from running the RPA process from the RPA service platform for the unattended RPA robot; and
when the RPA-enabled application determines that the RPA process is to be executed by a locally running attended RPA robot:
send the process initiation request to the locally executing attended RPA robot via Inter-Process Communication (IPC), and
receive output generated from running the RPA process from the attended robot via IPC.

18. The computer program of claim 17, wherein the program is further configured to cause the at least one processor to:
display results from the output generated from running the process in a user interface (UI) of the RPA-enabled application.

19. The computer program of claim 17, wherein when a robot type variable for the trigger is set to intelligent, the program is further configured to cause the at least one processor to:
receive the trigger for initiation of the RPA process;
search locally for an attended robot for the RPA process; and
when a suitable local attended robot is found for the RPA process, cause the attended robot to execute the RPA process, wherein the intelligent robot type variable causes the RPA-enabled application to first search for a local attended RPA robot to complete a task, and when not found, to search for a remote unattended RPA robot to complete the task.

20. The computer program of claim 19, wherein when the suitable local attended robot is not found for the RPA process, the program is further configured to cause the at least one processor to:
  query an RPA service platform for a suitable unattended robot for the RPA process; and
  when the suitable unattended robot is found for the RPA process, cause execution of the unattended robot.

\* \* \* \* \*